(12) United States Patent
Taniguchi et al.

(10) Patent No.: US 8,074,335 B2
(45) Date of Patent: Dec. 13, 2011

(54) CELL PRODUCTION METHOD AND CELL PRODUCTION FACILITY

(75) Inventors: Takao Taniguchi, Toyota (JP);
Shigeharu Ikeda, Kariya (JP);
Kuniyuki Hashimoto, Nishio (JP);
Junji Sugawara, Nagoya (JP)

(73) Assignee: Aisin AW Co., Ltd., Aichi (JP)

( * ) Notice: Subject to any disclaimer, the term of this patent is extended or adjusted under 35 U.S.C. 154(b) by 973 days.

(21) Appl. No.: 11/791,541

(22) PCT Filed: Dec. 22, 2005

(86) PCT No.: PCT/JP2005/023677
§ 371 (c)(1),
(2), (4) Date: Feb. 14, 2008

(87) PCT Pub. No.: WO2006/068251
PCT Pub. Date: Jun. 29, 2006

(65) Prior Publication Data
US 2009/0025198 A1 Jan. 29, 2009

(30) Foreign Application Priority Data

Dec. 24, 2004 (JP) ................................ 2004-374179

(51) Int. Cl.
*B21D 39/03* (2006.01)
*B23P 23/00* (2006.01)
*B23P 19/00* (2006.01)

(52) U.S. Cl. ............... 29/430; 29/564; 29/791

(58) Field of Classification Search .................... 29/430, 29/428, 564, 791, 429, 469, 897.2, 281.1, 29/281.4; 414/222.13
See application file for complete search history.

(56) References Cited

U.S. PATENT DOCUMENTS

2008/0104818 A1* 5/2008 Taniguchi et al. .............. 29/428
2008/0189927 A1* 8/2008 Taniguchi et al. .............. 29/430

FOREIGN PATENT DOCUMENTS

| DE | 4020286 A1 | 1/1992 |
| DE | 19902220 A1 | 8/2000 |
| EP | 0718179 A1 | 6/1996 |

(Continued)

OTHER PUBLICATIONS

European Search Report dated Apr. 4, 2011, issued in corresponding European Patent Application No. 05819766.6-1262 / 1829642.

*Primary Examiner* — John C Hong
(74) *Attorney, Agent, or Firm* — Sughrue Mion, PLLC

(57) ABSTRACT

A cell manufacturing method in which a main operator, who carries out main operations that includes a plurality of steps in which parts are attached to a workpiece, is moved with the workpiece so as to transit a plurality of stations at which auxiliary steps related to the main operation are carried out. A main car on which a workpiece is mounted and on which a main operator rides and a subsidiary car on which a subsidiary operator rides, the subsidiary operator preparing at least a portion of parts and/or jigs that are necessary for the main operation. The main car automatically travels on a predetermined travel path that transits a plurality of stations, and the subsidiary car travels together with the main car so as to enable transferring parts and/or jigs between the main car and the subsidiary car.

20 Claims, 28 Drawing Sheets

FOREIGN PATENT DOCUMENTS

| | | |
|---|---|---|
| GB | 2361904 A | 7/2001 |
| JP | 59-15626 U | 1/1984 |
| JP | 2-83816 U | 6/1990 |
| JP | 8-47818 A | 2/1996 |
| JP | 2000-281209 A | 10/2000 |
| JP | 2003-251575 A | 9/2003 |
| JP | 2004-230485 A | 8/2004 |
| JP | 2005-182388 A | 7/2005 |

* cited by examiner

FIG. 4

OPERATION STEPS OVERVIEW LIST

| MAIN OPERATION | | SUBSIDIARY OPERATION | |
|---|---|---|---|
| SYMBOL | NAME | SYMBOL | NAME |
| ML1 | B2 PISTON AND SNAP RING ASSEMBLED | SL1 | B2 ASSEMBLY ASSEMBLED |
| ML2 | REAR SUB-ASSEMBLY ASSEMBLED | SL2 | REAR SUB-ASSEMBLY ASSEMBLED |
| ML3 | B2 BRAKE PLATE THICKNESS MEASURED AND B2 BACKING PLATE SELECTED | | |
| ML4 | B2 BACKING PLATE AND SNAP RING ASSEMBLED | SL4 | SNAP RING PREPARED |
| ML5 | F1 ONE-WAY CLUTCH AND SNAP RING ASSEMBLED | SL5 | ONE-WAY CLUTCH AND SNAP RING PREPARED |
| ML6 | CENTER SUPPORT AND COUNTER GEAR ASSEMBLY ASSEMBLED | SL6 | COUNTER GEAR ASSEMBLY ASSEMBLED |
| ML7 | COUNTER GEAR INCLINATION MEASURED | | |
| ML8 | DRIVE PINION ASSEMBLY ASSEMBLED FOR THE DIFF | SL8 | 1) DRIVE PINION ASSEMBLY ASSEMBLED 2) DIFF ASSEMBLY ASSEMBLED |
| ML9 | FRONT ASSEMBLY DRIVE SUN GEAR AND B-1 BAND BRAKE ASSEMBLED | SL9 | FRONT SUB-ASSEMBLY ASSEMBLED |
| ML10 | OIL PUMP ASSEMBLY BOLT TIGHTENED | SL10 | OIL PUMP ASSEMBLY ASSEMBLED |
| ML11 | END PLAY MEASURED | | |
| ML12 | B1 BAND BRAKE STROKE MEASURED | | |
| ML13 | B1 PISTON ASSEMBLY ASSEMBLED | | |

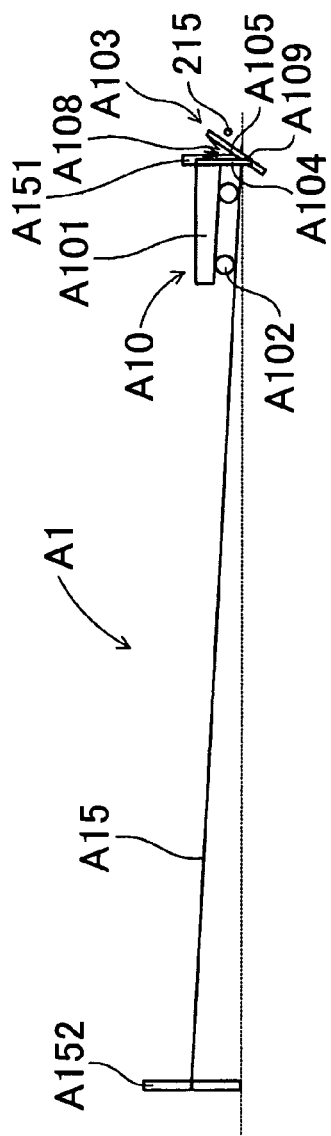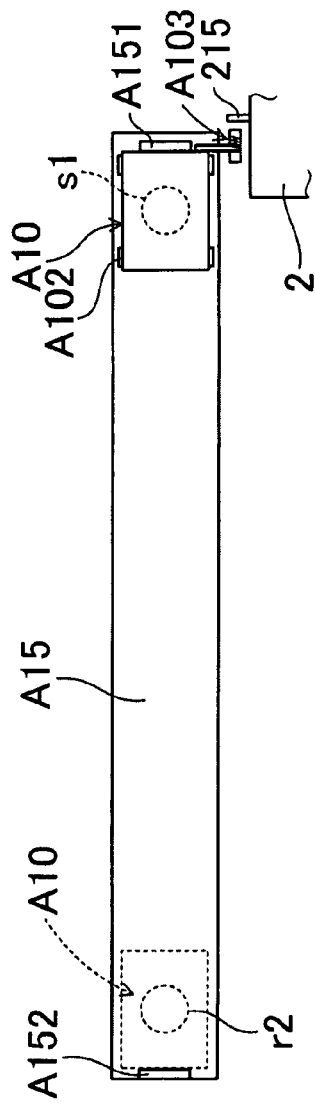
F I G. 16A
F I G. 16B

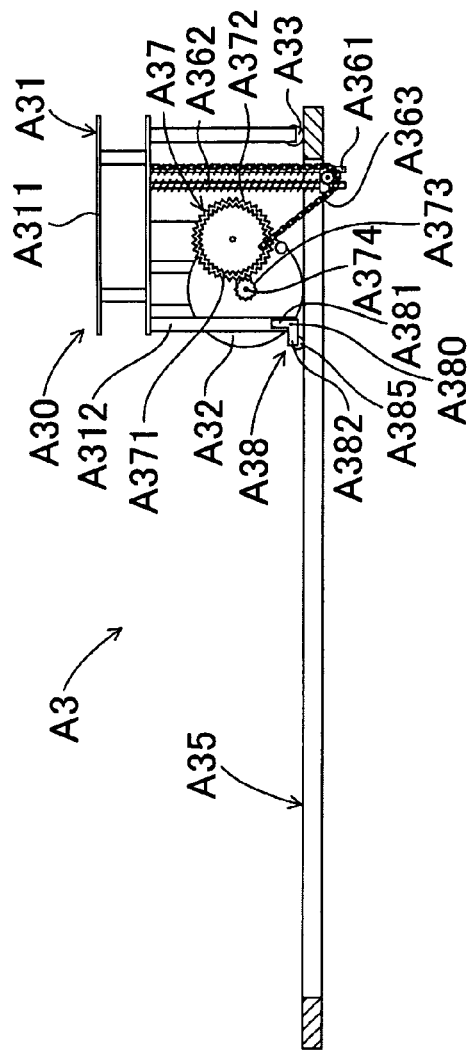
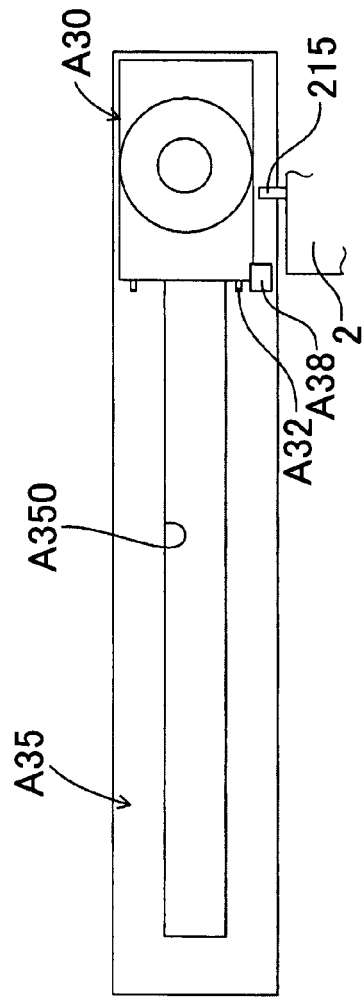
FIG. 32A
FIG. 32B

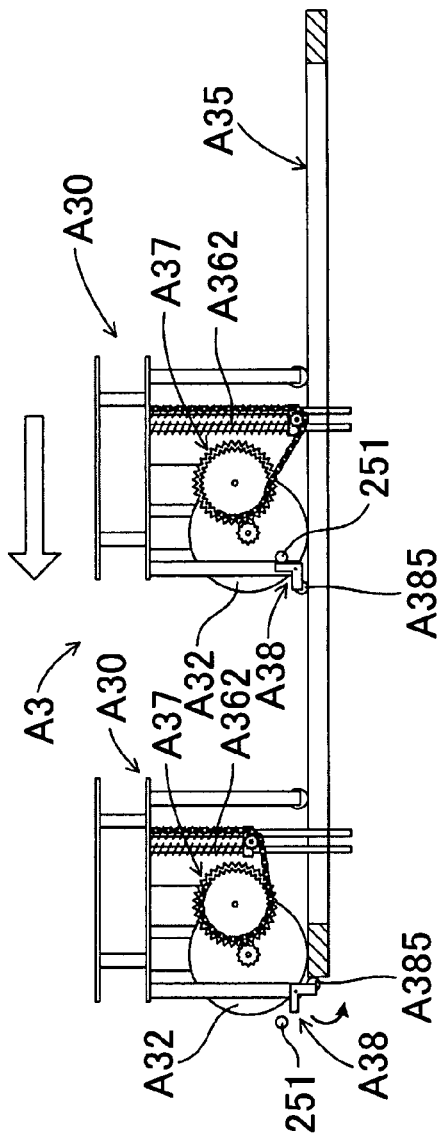
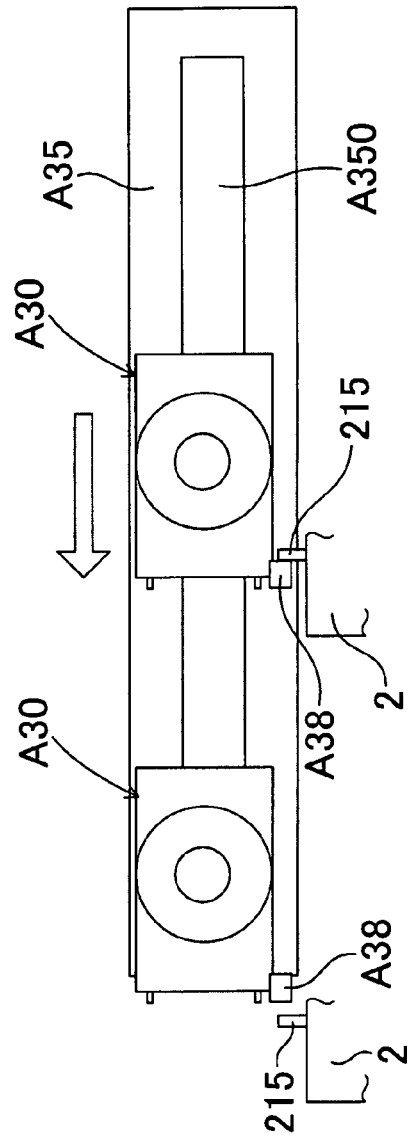
FIG. 33A
FIG. 33B

CELL PRODUCTION METHOD AND CELL PRODUCTION FACILITY

TECHNICAL FIELD

Exemplary embodiments of the present invention relate to a cell manufacturing method in which substantially one operator carries out a plurality of operation steps on one workpiece, and relate to a cell manufacturing facility.

BACKGROUND ART

One method of manufacturing products is what is termed a line production method, which uses a conveyor belt. In this line production method, a plurality of stations is provided along a conveyor line, and at each station, there is an operator positioned with manufacturing equipment, tools, parts, materials and the like. In addition, workpieces are conveyed in sequence by a conveyor belt, prescribed operating steps are carried out at the respective stations, and the product is thereby manufactured. While this line production method is suitable for mass production, a large capital expenditure is necessary, and when the product specifications are changed, this method cannot readily and flexibly respond.

In recent years, in order to respond to the diversification of consumer needs and the like in the field of automobile production and electrical equipment production, the need to manufacture many models in small lots has been increasing. In place of the line production method, a cell manufacturing method, in which one operator carries out a plurality of operation steps, is gradually coming into use as a production method that is suitable for this small-scale production of many models. In the cell manufacturing method, there are the advantages that the response to product specification changes is facilitated and capital expenditures can be reduced. In addition, from the point of view of the operator, the method will be embraced willingly because there is an awareness that the product has been completed by himself.

Japanese Patent Application Publication No. JP-A-2003-251575, for example, discloses an example of a cell manufacturing method in which a workpiece is mounted on a hand-pushed operating car, and operations are carried out while the car transits the plurality of stations. In addition, a means to raise and lower the workpiece is provided, and improvements in productivity and a reduction in the operator fatigue can be realized.

However, in the cell manufacturing method of Patent Document 1, while the operating car is in motion, the operation steps do not proceed, and it cannot be said that the productivity is sufficient. Thus, a significant increase in efficiency and a reduction in production lead time can be expected. Furthermore, there are cases in which parts that are pre-assembled by combining component parts are necessary, and the problems of eliminating storage space and the labor for managing these parts remain. In addition, when one operator carries out all operation steps, including the operations for the sub-assembly, the number of stations becomes too large, the movement distance is drastically increased, and the content of the operation is complex. Thus, there are cases in which this cannot be adopted as a suitable production method.

In consideration of these circumstances, aspects of the present invention provide a cell manufacturing method and a cell manufacturing facility that significantly increases the productivity beyond that of the related art, can reduce production lead time, minimizes the amount of parts requiring storage, and distributes the operation steps among a plurality of operators.

SUMMARY OF INVENTION

An aspect of the present invention is to provide a cell manufacturing method in which a main operator who carries out main operations that include a plurality of steps in which parts are attached to a workpiece, is moved with the workpiece so as to transit a plurality of stations in which auxiliary steps related to the main operations are carried out by providing a main car on which the workpiece is mounted and on which the main operator rides; and providing a subsidiary car on which a subsidiary operator rides, the subsidiary operator carrying out subsidiary operations in which at least one portion of parts and/or jigs that are necessary for the main operations. Then, the main car automatically travels along a predetermined travel route that transits the plurality of stations, and the subsidiary car and the main car travel together so as to be able to transfer parts and/or jigs between the main car and the subsidiary car.

In accordance with an aspect of the cell manufacturing method of the present invention, at least a main car and a subsidiary car are used, and it is possible to transfer parts and/or jigs between the main car and the subsidiary car. It is possible to transfer the parts and/or jigs between the main car and the subsidiary car by making the main car and the subsidiary car approach each other very closely to travel together such that it is possible to carry out the transfer directly between the main operator on the main car and the subsidiary operator on the subsidiary car. In addition, rather than directly transferring the parts and/or jigs between the main operator and the subsidiary operator in this manner, it is also possible to make the main car and the subsidiary car travel together so as to enable what can be called indirect transfer via a transfer apparatus, which is described below.

It will be appreciated that, in the present specification, for convenience, a facility that has a function in which auxiliary steps related to the main operations outside the main car and the subsidiary car are carried out is called a "station". Examples of a "station" include a station at which an auxiliary step is carried out wherein a workpiece is loaded on an operation car, a station at which an auxiliary step is carried out wherein a workpiece is unloaded from an operation car, a station at which an auxiliary step is carried out wherein parts to be attached to the workpiece are supplied, a station at which an auxiliary step is carried out wherein tools (jigs) that are used in an operation are supplied, a station at which an auxiliary step is carried out in which predetermined processing is carried out after the workpiece has been received from an operation car, and the like. As an example, the transfer apparatus, which will be described below, is one type of station.

Subsidiary operations include operations in which parts are assembled by carrying out a sub-assembly after the component parts have been combined. In addition, the subsidiary operations may include operations in which parts are set on jigs and operations in which component parts are set on jigs.

An aspect of the invention may further improve the cell manufacturing method of the Japanese Patent Application Publication No. JP-A-2003-421122, and one exemplary objective may include broadening of an application range. Specifically, a method and facility are disclosed, in which an operation step for a relatively large product is divided among a plurality of operators to carry out cell manufacturing. In this kind of operation, movement over a rather long distance is required because parts to be assembled and assembly jigs are not completely encompassed within a range in which the operator's hand will reach. While utilizing the characteristic disclosed in the above application, in which an operation is carried out on an operation car while traveling, the present invention has as a new characteristic, such as dividing the operation steps into a main step and subsidiary steps, and proceeding by carrying out the steps at the same time.

In the cell manufacturing method according to an exemplary embodiment of the present invention, at least two operators are necessary: a person who carries out main operations on a main car and a person who carries out subsidiary operations on a subsidiary car.

In the main operations, the principal operation steps that bring the assembly of the product to completion are carried out. Note that the concept of a "product" in the present specification is not limited to the finished product that is used by what is referred to as the end user, but includes all single items that are assembled by a plurality of sequences of operations, such as products that are parts that are incorporated into these finished products.

In addition, the main operations are not simply general assembly operations, in which parts are incorporated, but may also include inspection operations in which, for example, the dimensions of the finished product are confirmed or the operational status is confirmed. A portion of the tools that are used in the main operations are provided in the main car, and the remainder can be provided at each station. In addition, among the members and parts that are used in the main operations, those necessary for preparatory operations can be received from a subsidiary car, and the others can be supplied from each station. Small parts such as screws may be provided in the main car.

In subsidiary operations, the preparation of parts and jigs that are required in the main operations is carried out. In the subsidiary operations, composite parts (referred to as "assemblies" in the embodiments) may be assembled by combining and pre-assembling component parts. In addition, the parts or component parts may be set on a jig and then transferred to the main operation. The tools, members, and parts that are used in the subsidiary operations can be prepared in advance at each of the stations or on the subsidiary cars.

In the cell manufacturing method according to an exemplary embodiment of the present invention, the main operations and the subsidiary operations described above may proceed by being carried out at the same time on two cars that travel together. Thereby, because the operation steps have been divided and carried out, it is possible to reduce the manufacturing lead time. In addition, because the parts that have been assembled in the subsidiary operations are used immediately in the main operations, the need to temporarily store these parts is eliminated.

In addition, in the cell manufacturing method according to an exemplary embodiment of the present invention, at least a portion of the operation in which parts and/or jigs are transferred between the main car and the subsidiary car may be carried out by using a transfer apparatus which is a type of station, that provides at least one of main delivery means that delivers parts and/or jigs that have been disposed at a second receiving position r2 to a first serving portion s1 and subsidiary delivery means that delivers parts and/or jigs that have been disposed at a first receiving position r1 to a second serving position s2, where the first serving position s1 is a position at which parts and/or jigs are delivered to a subsidiary car, a first receive position r1 is a position at which parts and/or jigs are received from a subsidiary car, a second serving position s2 is a position at which parts and/or jigs are delivered to a main car, and a second receiving position r2 is a position at which parts and/or jigs are received from the main car.

Specifically, in the case in which the transfer of parts and/or jigs that are handled on both the subsidiary car and the main car is indirectly carried out via the transfer apparatus, when the first serving position s1, at which delivery to a subsidiary car occurs, and the second receiving position s2, at which reception from a main car occurs, are not the same, before cell manufacturing is carried out the next time, it is necessary to carry out an operation in which, for example, the part and/or jig that is appropriate for the operation on the station side is moved from the second receiving position r2 to the first serving position s1. In contrast, by providing a transfer apparatus that is furnished with the main delivery means and carrying out this moving operation by this transfer apparatus, it is possible to reduce the preparatory operations and it is possible to carry out the repeated performance of the cell manufacturing method smoothly.

In will be appreciated that what is herein referred to as "parts and/or jigs" is a concept that may include only the jig or the jig and part which are assembled in the case in which, for example, the subsidiary car has received only a jig and this is directly or indirectly delivered to the main car after a part has been set on the jig, and after the part that has been set on the jig has been incorporated into the workpiece at the main car, the jig that is no longer in use is moved for an operation in the next subsidiary car.

Similarly, also in the case in which the second serving position s2, at which the part and/or jig is transferred to the main car, and the first receiving position r1, at which the part and/or jig is received from the subsidiary car, are not the same, during the time from a subsidiary car passing by until the main car has reached it, for example, it may be necessary to carry out an operation in which the appropriate part and/or jig is moved from the first receiving position r1 to the second serving position s2 as an operation on the station side. In contrast, by providing a transfer apparatus having a subsidiary delivery means and carrying out the operation of moving the part and/or jig to the transfer apparatus, it is possible to reduce the preparatory operations, and it is possible to carry out the repeated performance of the cell manufacturing method smoothly.

In addition, the second serving position s2 may be disposed farther toward the back than the first receiving position in the forward direction of the main car. By setting the second serving position s2 and the first receiving position r1 in this manner, it is possible for the main car to receive this part and/or jig at the second serving position s2 that is on a side in the direction of the forward motion farther to the back than the position (first receiving position r1) at which the part and/or jig, which have been installed in the subsidiary car, have been positioned. Thus, it is possible to eliminate the distance that the main car moves up to the first receiving position r1. Thereby, when designing the cell manufacturing facility, it is possible to obtain the superior additional effect that the overall length can be reduced.

In order to actually carry a cell manufacturing method according to an aspect of the present invention, it is possible to use a cell manufacturing facility according to an exemplary embodiment of the present invention, which can be explained as follows.

Specifically, a cell manufacturing facility according to an exemplary embodiment of the present invention, wherein a main operator, who carries out main operations that include a plurality of steps in which parts are installed on a workpiece, is moved along with the workpiece so as to transit a plurality of stations at which auxiliary steps related to the main operations are carried out, may be structured to include:

a main car that is provided with a workpiece holding portion that holds the workpiece and a riding portion that the main operator can ride so as to be able to carry out operations on the workpiece that is being held in the workpiece holding portion, and is provided with a travel control apparatus that controls the travel state; and a subsidiary car that is provided with a riding portion that the subsidiary operator can ride, the subsidiary operator carrying out subsidiary operations in which parts and/or jigs that are necessary for the main operations is prepared. The main car may automatically travel on a predetermined travel route that transits the plurality of stations, and the subsidiary car travels together with the main car so as to enable transferring parts and/or jigs between the main car and the subsidiary car.

As described above, the main car is provided with a workpiece holding portion that holds the workpiece and a riding portion that the operator can ride so as to be able to carry out operations while traveling.

In addition, the main car is provided with travel control apparatus that controls the state of travel, such as the travel direction, the travel speed, and the like. An automated guided vehicle, usually referred to as an AGV, can be used for the main car that is provided with the travel control apparatus.

According to this mode, the main car can automatically travel along a prescribed travel route while the main operator is riding therein. Therefore, it is not necessary for the main operator to drive the main car, it is possible for the operator to concentrate on the operation even while traveling, and the efficiency of the operation is increased. Note that a driving operation portion may be provided for the main operator to operate while riding. Thereby, depending on necessity, the main operator can switch between automatic travel and manual travel, and can carry out intended travel.

A plurality of main cars may also be able to travel simultaneously along the travel route. For example, if a plurality of automated guided vehicles is used and control is carried out such that the automated guided vehicles maintain a space therebetween, a production amount can be expected that is equivalent to the production amount per automated guided vehicle multiplied by the number of vehicles.

The subsidiary car is provided with a riding portion that enables the operator to ride so as to be able to carry out operations while traveling. According to this mode, even while the subsidiary car is traveling similarly to the main car, the subsidiary operator can concentrate on the operation, and the efficiency of the operation is increased.

According to another aspect of the present invention, the subsidiary car is provided with tracking means in order to travel together with the main car. The tracking means may be a linking rod that links the subsidiary car and the main car. In addition, the tracking means may include wireless communication means that operates between the subsidiary car and the main car and a subsidiary travel control apparatus that controls the travel of the subsidiary car. The subsidiary car may travel together with the main car so as not to become separated therefrom, so that it is possible to directly or indirectly deliver parts and/or jigs to the main car.

A connecting rod that physically connects the subsidiary car and the main car may be used as the tracking means for traveling together. Because the subsidiary car can also travel due to the drive force of the main car due to the connecting rod, a power source for the subsidiary car becomes unnecessary. However, a condition of this mode is that no obstacles are present where the connecting rod passes along the travel route.

In cases in which, for example, the part shelves of a station interfere with the passage of a connecting rod, wireless communication means and a subsidiary car control apparatus may be provided. In the wireless communication means, information about the position and speed of the cars can be transmitted between the subsidiary car and the main car. In addition, in the subsidiary travel control apparatus, it is possible to carry out control of the travel of the subsidiary car in conformity to the position and speed of the main car. Note that in a method using wireless communication means, a power source may also be necessary for the subsidiary car.

The same number of subsidiary cars as the plurality of main cars may travel together associated with the respective main cars. In order to increase the production amount, the subsidiary cars that are associated with the plurality of main cars may be used in the same number as the main cars and travel together.

The main car may have a circular route on which it returns to the original position after circling one time, and the subsidiary car may have a circular subsidiary route that is on the outside of this circular route. At the point in time that the main car has transited all stations and the workpiece has been completed, the workpiece is exported from the main car. Subsequently, in order to manufacture the next workpiece, it may be necessary for the main car to return to the original start position. Therefore, having a circular route in which the workpiece export position is associated with the start position is advantageous in terms of production efficiency. In the case in which this route is made a linear one-way return travel route, time loss occurs when the main car returns along the return route without any operation being carried out.

When the main car has a circular route, the subsidiary car travels together along the outside or the inside of the circular route of the main car. Here, the case in which the subsidiary operations handle a larger number of parts than the main operations is common. Therefore, an arrangement in which the main car is disposed on the inside and the subsidiary car is disposed on the outside, and furthermore, the parts are supplied from the outside, is rational.

The travel route of the main car is segmented into a plurality of segments, and separate subsidiary cars that travel together on the respective segmented travel routes may be provided. In the case in which the subsidiary car has a larger number of operations than the main car, separate subsidiary cars may be provided such that the subsidiary operations are carried out by a plurality of operators. Thereby, it is possible to distribute the subsidiary operations to the plurality of operators rationally, and the overall production efficiency is significantly improved.

For example, in the case in which there are twice as many subsidiary operations as there are main operations, the travel route may be partitioned into a front half and a back half, and one main car may travel together with two subsidiary cars, where one subsidiary car is on the front half and the other subsidiary car is on the back half. According to this mode, the subsidiary car that travels together along the front half of the travel route can continue the subsidiary operations independently while the main car is traveling along the back half of the route. In addition, it is possible to finish the subsidiary operations exactly by the time that the main car has returned, and to deliver parts and/or jigs. A subsidiary car that travels together along the back half of the travel route is similar.

The subsidiary car may have a subsidiary travel route along which it travels together with the main car and a subsidiary return route along which it returns to the original position after separating from the main car. In addition, the subsidiary car may have a subsidiary travel route along which it travels together with the main car and may return to the original position by traveling backward along the subsidiary travel route after separating from the main car.

In the case in which the travel route of the main car described above is segmented and the main car travels together with separate subsidiary cars, after the subsidiary car has traveled together along the subsidiary travel route, the subsidiary car separates from the main car and returns to the original position by traveling on its own route. At this time, a subsidiary return route may be provided that is separate from the subsidiary travel route and the subsidiary car may travel backward along the subsidiary travel route. Whether to use either of the routes may be determined by taking into account the disposition of the content of the subsidiary operations and the parts and jigs, restrictions on the operation area, and the like.

In addition, there is a transfer apparatus, which is a type of station, for carrying out the transfer operation of parts and/or jigs between the main car and the subsidiary car. The transfer apparatus is provided with at least one of a main delivery means that delivers parts and/or jigs that have been disposed at a second receiving position r2 to a first serving position s1 and a subsidiary delivery means that delivers parts and/or jigs that have been disposed at a first receiving position r1 to a second serving position s2 are provided, where the first serving position s1 is a position at which parts and/or jigs are delivered to a subsidiary car, a first receiving position r1 is a position at which parts and/or jigs are received from a subsidiary car, a second serving position s2 is a position at which parts and/or jigs are delivered to the main car, and a second receiving position r2 is a position at which parts and/or jigs are received from the main car.

Specifically, as described above, in the case in which the transfer of parts and/or jigs that are handled on both the subsidiary car and the main car is carried out indirectly via the transfer apparatus, when the first serving position s1, at which transfer to a subsidiary car occurs, and the second receiving position s2, at which reception from a main car occurs, are not the same, or in the case in which the second serving position s2, at which parts and/or jigs are transferred to the main car, and the first receiving position s1, at which parts and/or jigs are received from a subsidiary car, are not the same, before the next subsidiary car has reached the first serving position s1 or before the next main car has reached the second serving position s2, it is necessary to carry out an operation in which, for example, the part and/or jig that is appropriate for the operation on the station side is moved to from the second receiving position r2 to the first serving position s1, or an operation in which parts and/or jigs are moved from the first receiving position r1 to the second serving position s2. In contrast, providing a transfer apparatus that is furnished with at least one of main delivery means and subsidiary delivery means, it is possible to carry out this transfer operation by this transfer apparatus, it is possible to reduce the preparatory operations and it is possible to carry out the repeated performance of the cell manufacturing method smoothly.

The main transfer means and/or the subsidiary transfer means are structured so as to have a mounting platform that can move between a start point and an end point, and this mounting platform is disposed so as to be able to move along an inclined path that is inclined such that the height increases as the end point is approached from the start point. From the start point to the end point, the mounting platform is linked with the main car and/or the subsidiary car and moves in synchrony therewith. At the end point, the link between the mounting platform and the main car and/or the subsidiary car is released, and thereby the mounting platform moves along the inclined path under its own weight, and returns to the start point to stand-by.

In this case, the forward motion of the mounting platform can be carried out by the travel force of the main car or the subsidiary car, which are linked, whereas the return of the mounting platform can be realized by the mounting platform's own weight due to the presence of the inclined path. Specifically, it is possible to move the mounting platform without introducing a dedicated drive power. Thereby, it is possible to realize a reduction in the costs of introducing equipment and the running costs.

The main transfer means and/or the subsidiary transfer means are structured so as to have a mounting platform that can move between a start point and an end point, and the mounting platform includes energy storing means that stores energy accompanying the movement from the start point to the end point and kinetic energy converting means that converts the energy that has been stored by the energy storing means to kinetic energy for moving the mounting platform from the start point to the end point. The mounting platform moves in synchrony with the main car and/or the subsidiary car from the start point to the end point in a linked state, and at the same time, energy is accumulated in the energy storing means. By releasing the linked state with the main car and/or the subsidiary car, the mounting platform moves due to the kinetic energy, which is the energy that has been stored in the energy storing means that has been converted to kinetic energy by the kinetic energy converting means, and returns to the start point to stand-by.

In this case as well, the forward movement of the mounting platform can be carried out by the travel force of the main car and the subsidiary car, which are linked thereto, whereas the reverse movement of the mounting platform is realized by the energy storing means and the kinetic energy converting means. Specifically, in this case as well, it is possible to move the mounting platform without introducing a dedicated drive power. Thus, it is possible to realize a reduction of the equipment introduction costs and the running costs.

In addition, the main transfer means and/or the subsidiary transfer means may be structured so as to have a mounting platform that can move between a start point and an end point, and the mounting platform includes an energy storing means that stores energy accompanying the movement of the mounting platform from the start point to the end point due to the weight of the parts and/or jigs that are mounted thereon and a kinetic energy converting means that converts the energy that has been stored in the energy storing means to kinetic energy for moving the mounting platform from the start point to the end point. Energy is accumulated by the energy storing means accompanying the movement of the mounting platform from the start point to the end point due to the parts and/or jigs that are mounted on the mounting platform at the start point, and the mounting platform stands by. By removing the parts and/or jigs from the mounting platform at the end point, the mounting platform moves due to the kinetic energy, which is the energy that has been stored in the energy storing means that has been converted to kinetic energy by the kinetic energy converting means, and returns to the start point to stand-by.

In this case, the forward motion of the mounting platform is not synchronous with the travel of the main car or the subsidiary car, but due to the energy storing means and the kinetic energy converting means, it is possible to realize the movement action of the mounting platform due to the weight of the parts and/or jigs. Specifically, in this case as well, it is possible to move the mounting platform without introducing a dedicated drive power. Thus, it is possible to realize a reduction in the equipment introduction costs and the running costs.

In addition, the main delivery means and the subsidiary delivery means are structured so as to have an inclined rail such that the height decreases as the end point is approached from the start point, and by engaging the parts and/or jigs to the rail at the start point, the parts and/or jigs move along the rail under their own weight, and move to the end point to stand-by.

In this case, due to the presence of the rail, it is possible to move the parts and/or jigs by their own weight, and the parts and/or jigs can be moved without the introduction of a dedicated drive power. Thus, it is possible to realize a reduction in the equipment introduction costs and the running costs.

BRIEF DESCRIPTION OF THE DRAWINGS

Aspects of the present invention will become more apparent by describing in detail non-limiting embodiments thereof with reference to the attached drawings, in which:

FIG. 4 is a figure of a transmission production step list that shows operation steps according to an exemplary embodiment.

FIG. 16 is (a) a side view that shows a delivery apparatus, and (b) a planar view that shows the delivery apparatus according to an exemplary embodiment.

FIG. 32 is (a) a side view that shows the structure of the energy storing-type delivery apparatus, and (b) a planar view that shows the structure of the energy storing-type delivery apparatus according to an exemplary embodiment.

FIG. 33 is (a) a side view that shows the state in which the mounting platform of the energy storing-type delivery apparatus moves forward, and (b) a planar view that shows the state in which the mounting platform of the energy storing-type delivery apparatus moves forward according to an exemplary embodiment.

DETAILED DESCRIPTION OF EXEMPLARY EMBODIMENTS OF THE INVENTION

The following description of illustrative, non-limiting embodiments of the invention discloses specific configurations and components. However, the embodiments are merely examples of the present invention and, thus, the specific features described below are merely used to more easily describe such embodiments and to provide an overall under-standing of the present invention. Accordingly, one skilled in the art will readily recognize that the present invention is not limited to the specific embodiments described below. Furthermore, the descriptions of various con-figurations, components, processes and operations of the embodiments that are known to one skilled in the art are omitted for the sake of clarity and brevity.

Exemplary embodiments of the invention will be explained in detail with reference to FIG. 1 to FIG. 15. The perspective view of FIG. 1 is an explanatory drawing that shows a facility that is an embodiment of a cell manufacturing facility of an exemplary embodiment of the present invention and in which an automatic transmission is manufactured.

Figure 1:
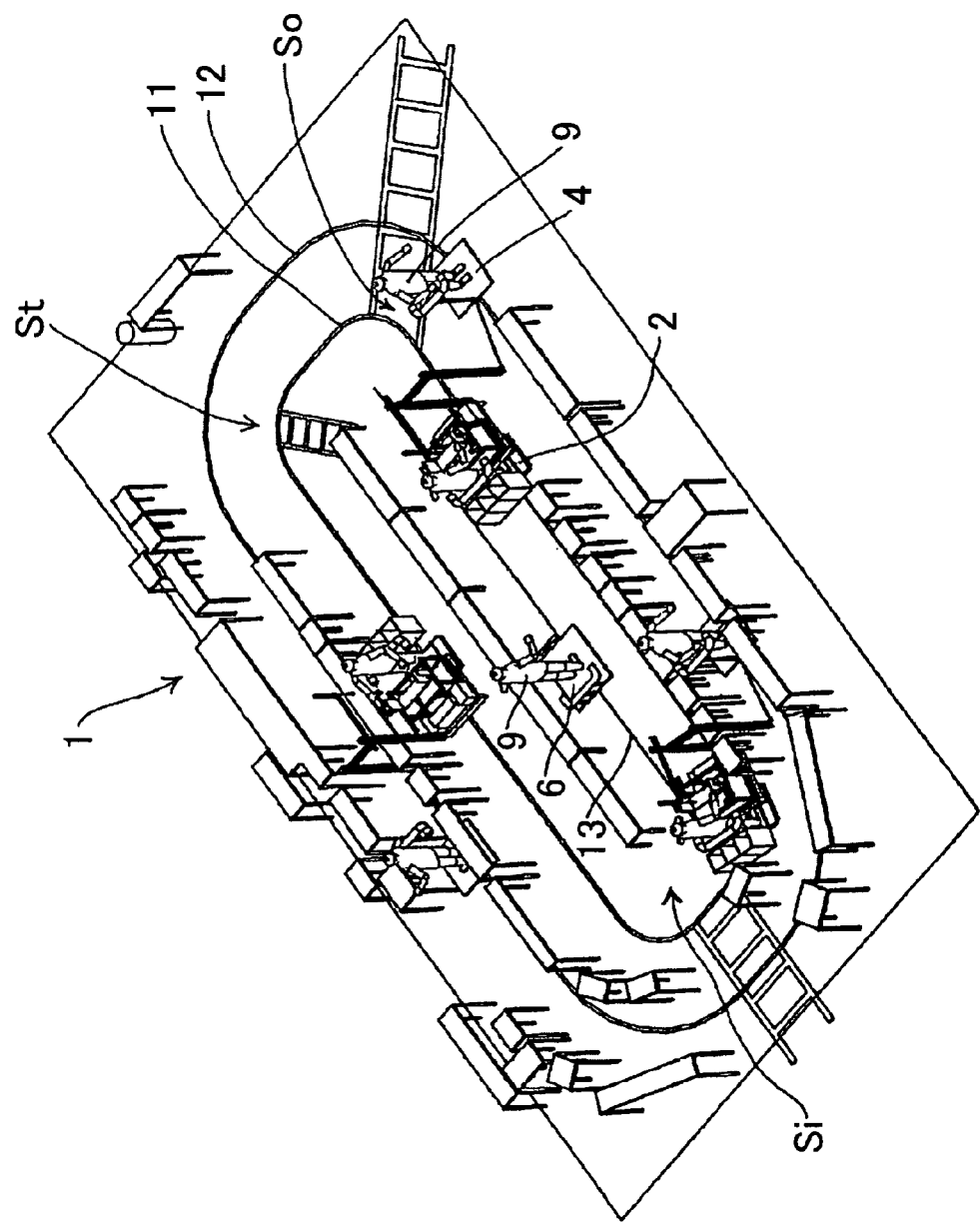
FIG. 1 is a perspective view for explaining a transmission production facility, which is an exemplary embodiment of the cell manufacturing facility of the present invention.

In the transmission production facility in FIG. 1, three groups, each group consisting of a main car 2 and a subsidiary car 4, travel together. Each of the main cars 2 automatically travels along an inner circular route 11. The subsidiary cars 4 are linked to and pushed by the main cars 2, and travel on an outside circular route 12. In addition, a linear route 13 is provided from the lower left to the upper right in FIG. 1, and the preprocessing car 6 travels reciprocally thereon. The operators 9 ride each of the cars 2, 4, and 6, and are able to carry out operations while traveling. In addition, stations are provided along each of the routes 11, 12, 13, and structured such that necessary parts and/or jigs are prepared.

What is here referred to as a "station", as has been described above, is a facility having the function in which auxiliary steps related to the main operations are carried out. For example, not only do the import station Si, the switching station St, and the export station So described below correspond to stations, but, for example, there are also stations at which auxiliary steps are carried out. For example, there are stations where parts to be attached to the workpiece are supplied, stations at which tools (jigs) used in an operation are supplied, and stations at which predetermined processes are carried out after receiving a workpiece from the operation cars. More specifically, there are stations in the facility at which the operation steps of the main operations represented by the reference symbols ML1 to ML13 (FIG. 3) described below are carried out, and stations at which the operation steps of subsidiary operations represented by the reference symbols SL1 to SL10 (FIG. 3) described below are carried out. Furthermore, the transfer apparatus described below is also a type of station.

The case 7 of a transmission may serve as a workpiece of the transmission production facility 1. The case 7 is mounted on a preprocessing car 6 at the import station Si on the lower left of FIG. 1, and it is conveyed to the switching station St in the upper right of the figure. At the switching station St, the case 7 is switched from the preprocessing car 6 to the main car 2. While the main car 2 travels around the circular route 11 to the left, parts are installed in the case 7 to complete the transmission, and the main car 2 arrives at the export station So. At the export station So, after the completed transmission has been exported, the main car 2 returns to the switching station St, and the next case is mounted thereon.

A subsidiary car 4 is pushed by a main car 2 and travels along the outer circular route 12. The subsidiary car 4 is positioned, for example, to the right in front of a main car 2, and they travel together. In addition, parts and materials are taken from outside of the circular route 12, and after the preparatory operations such as pre-assembly have been carried out, the parts and jigs are mounted on a mounting platform that is inside of the circular route 12. Thereby, the transfer to the following main car 2 can be carried out.

Figure 2:
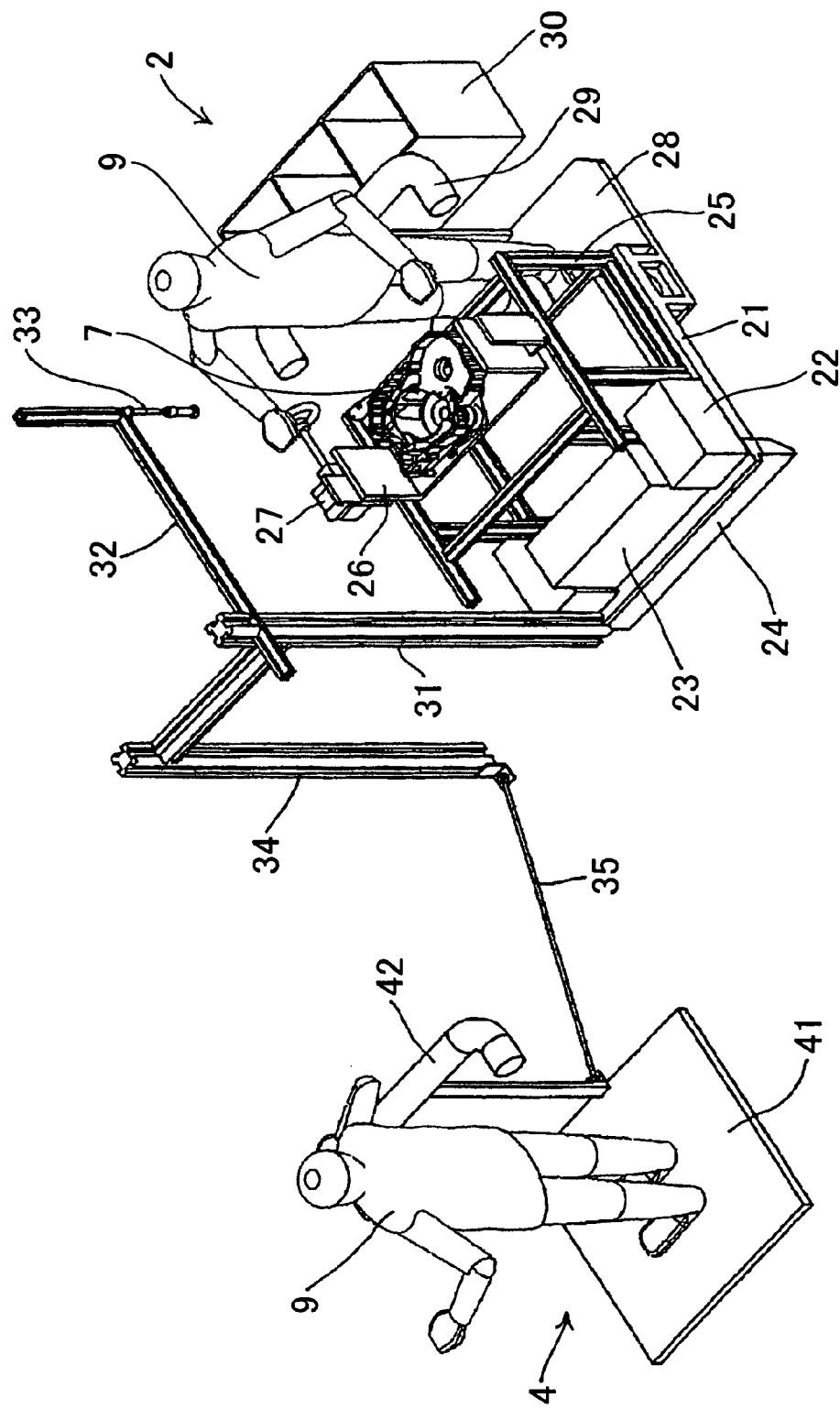
FIG. 2 is an enlarged perspective view for explaining a main car and a subsidiary car according to an exemplary embodiment.

Next, the structure of the main car 2 and the subsidiary car 4 will be explained with reference to the explanatory drawing in FIG. 2. Travel wheels and a route detecting sensor (not illustrated) are provided on the main car 2 at the lower side of the car body portion 21, and a battery 22 and a travel control apparatus 23 are provided on the upper side thereof. Furthermore, a bumper 24 and a proximity sensor are provided on the lower front portion of the car body portion 21.

The circular route 11 of the main car 2 is set by attaching a magnetic tape to the floor. The route detecting sensor detects the magnetic tape and a detection signal is transmitted to the travel control apparatus 23. Based on this detection signal, the travel control apparatus 23 controls the direction and speed of the travel wheels, and it is thereby possible to travel along the circular route 11. The proximity sensor detects obstacles and other main cars that are in front, and the detection signal is transmitted to the travel control apparatus 23. The travel control apparatus 23 is structured such that deceleration or stopping is carried out as necessary in order to avoid collisions, and safety is ensured.

A frame body portion 25, which is structured by assembling mold steel, is erected on top of the car body portion 21 of the main car 2, and the workpiece holding portion 26 and the workpiece adjusting portion 27 are erected on the frame body portion 25. The workpiece holding portion 26 holds the case 7 of a transmission, which is the workpiece. The case 7 is attached and released by the workpiece adjusting portion 27, and the adjustment of the height and position can also be carried out. Thereby, the operator 9 can fasten the case 7 at an appropriate height and position to carry out the operation. In addition, manual driving is also enabled by providing a driving portion on the back surface of the frame body 25.

A riding portion 28, on which an operator 9 can ride, extends out from the lower bottom portion of the car body portion 21 of the main car 2. In addition, a handrail 29 that is supported in an upward direction on the back portion of the riding portion 28 is provided, and thereby ensures the safety of the operator 9 who is riding and provides a convenient and stable operation position. Furthermore, a box-shaped accommodating portion 30 is provided behind the handrail 29, and tools and parts can be accommodated therein.

A support member 31 is provided in a perpendicular direction on the right front of the car body portion 21 of the main car 2, and an arm 32 is provided that overhangs in the horizontal direction from the upper end of the support member 31. A lifting jig 33 is provided on the distal end of the arm 32. The arm 32 can rotate in the horizontal direction, and an operation in which the parts and the jigs are lifted from the station and attached to the case 7 can be carried out easily.

A linking member 34 is erected facing the side from midway along the supporting member 31, and the linking member 34 turns downward at a position thereon. A linking rod 35 is disposed facing forward from the lower end of the linking member 34, and the distal end of the linking rod is linked to the car body portion 41 of the subsidiary car 4. The linking member 34 and the linking rod 35 correspond to the linking rod that physically links the subsidiary car 4 and the main car 2. A downward facing bracket-shaped gate is formed by the supporting member 31 and the connecting member 34. This gate is for preventing interference with stations that are disposed between the circular routes 11 and 12.

On the subsidiary car 4, route guidance wheels and travel wheels (not illustrated) are provided on the bottom side of the car body portion 41. The circular route 12 of the subsidiary car 4 is defined by providing guide grooves in the floor surface. The route guidance wheels are structured so as to fit into and be guided by the guide rail that is mounted on the floor along the circular route 12. In contrast, wheels whose forward direction freely changes are used for the travel wheels, and they can travel along the circular route 12. The method of defining the circular route 12 may also provide a guide groove or a guide wall rather than a guide rail, and the subsidiary car travels therealong.

According to the structure described above, when the main car 2 travels, the driving force is transferred to the subsidiary car 4 via the support member 31, the linking member 34, and the linking rod 35. Therefore, the subsidiary car 4 can travel together with the main car 2 in front thereof.

In addition, in the subsidiary car 4, the upper surface of the car body portion 41 doubles as a boarding portion. A handrail 42 is provided that is supported in an upward direction on the back portion of the car body portion 41, and ensures the safety of the operator 9 who is riding and provides a convenient and stable operation position.

Figure 3:
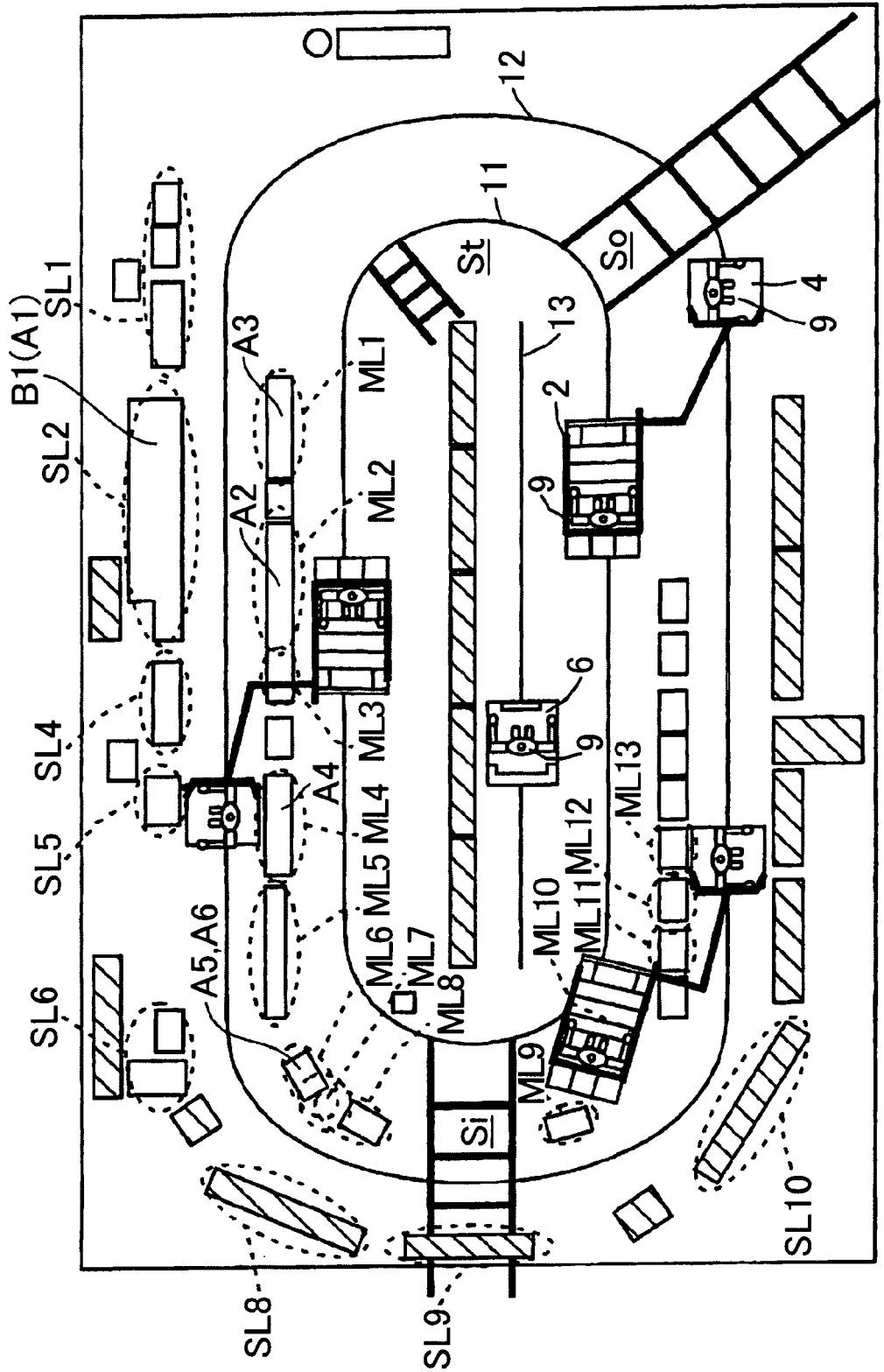
FIG. 3 is a planar drawing that shows the configuration of a cell manufacturing facility according to an exemplary embodiment.

Next, an exemplary method by which the transmission is manufactured by using the transmission production facility 1 described above will be explained. The planar drawing in FIG. 3 is a configuration diagram showing the configuration of the transmission manufacturing facility 1 that is shown in FIG. 1. In FIG. 3, the square shapes with diagonal lines indicate accommodation spaces for parts and members, and the unmarked squares indicate operation platforms and mounting platforms for transferring the parts and jigs. The reference symbols ML1 to ML13 show the operation steps in the main operations, and in FIG. 3, the approximate positions at which the parts and jigs are received are shown. By receiving parts at these positions, it is possible to carry out the installation operation in the case 7 that is held on the main car 2. The reference symbols SL1 to SL10 show the operation steps of the subsidiary operations, and in FIG. 3, the positions of the operation platforms corresponding to the operation steps SL1 to SL10 are shown. On these operation platforms, subsidiary operations are carried out in which the parts and jigs that are necessary for the main operations are prepared. It is noted that the part accommodation spaces, the operation platforms, and the mounting platforms described above correspond to stations.

FIG. 4 is an operation step overview list showing, in sequence, operation steps for transmission manufacture. FIG. 4 also shows relationships between the main operations and the subsidiary operations. Specifically, FIG. 4 shows that the parts and jigs that have been prepared by subsidiary operations are used in the main operations and are denoted by identical numerals. For example, FIG. 4 shows that the part referred to as the B2 assembly, which is assembled in subsidiary operation SL1, is used in the main operation ML1. An empty column means that the subsidiary operation is unnecessary, for example. It will be appreciated that the word "assembly" means the intermediate parts that are pre-assembled into the component parts and the combined parts.

Although omitted in the operation steps overview list in FIG. 4, the case 7 for the transmission, which is the workpiece, is imported from outside the operation area and is mounted on the preprocessing car 6 at the import station Si. The preprocessing car 6 conveys the case 7 to the switching station St via the travel route 13, and the preprocessing is carried out while traveling. At the switching station St, the case 7 is switched from the preprocessing car 6 to the main car 2. Then the main car 2 and the subsidiary car 4 begin to travel, and the overall operation steps begin. Below, the operation steps will be explained in sequence.

Figure 5:
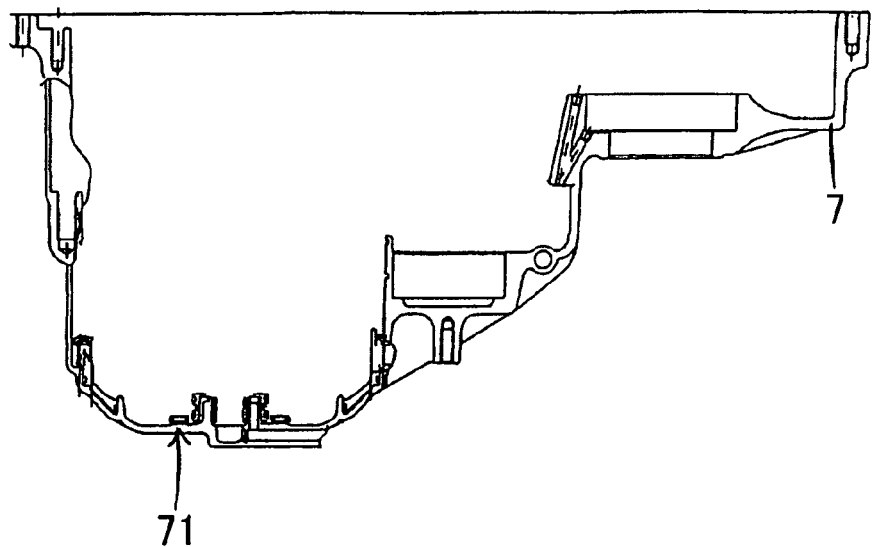
FIG. 5 is a drawing that shows a B2 assembly installation state during transmission production according to an exemplary embodiment.

First, in the subsidiary operation SL1, the operator 9, who carries out the subsidiary operation SL1, assembles the B2 assembly 71. The B2 assembly 71 involves a combined part for a brake portion. An O-ring, a return spring, and a snap ring are installed in the B2 iston, and this is held as a whole by an installation jig and is mounted on a mounting platform. Then, in main operation ML1, the operator 9, who carries out the main operation, takes the B2 assembly 71 on the mounting platform and installs it in the case 7. Thus, the cross-section of the case 7, which is the workpiece, is then in the B2 assembly installation state that is shown in FIG. 5.

The subsidiary operation SL1 described above is carried out on the traveling subsidiary car 4, and the main operation ML1 is carried out on the traveling main car 2. Therefore, when the operation has finished, in order to reach the position of the next step, additional time is not needed to move between steps. In addition, the transfer of the B2 assembly 71 is carried out on the mounting platform that is disposed between the two operation cars 2 and 4, and the operators 9 do not need to wait while moving. Note that after the installation operation has been completed, the installation jig remains on the mounting platform, and is used in the next assembly. At this time, because the position of the main car 2 moves between the installation start time and completion time, the mounting platform is a movable type mounting platform, and automatically returns the installation jig to the position at which it was at the start of the installation.

The distribution of the operation steps and the transfer procedures for the parts and jigs described above is similar in the following operation steps. Note that in the case in which a long period of time is required for particular operation steps, the operation cars 2 and 4 may be temporarily stopped.

Figure 6:
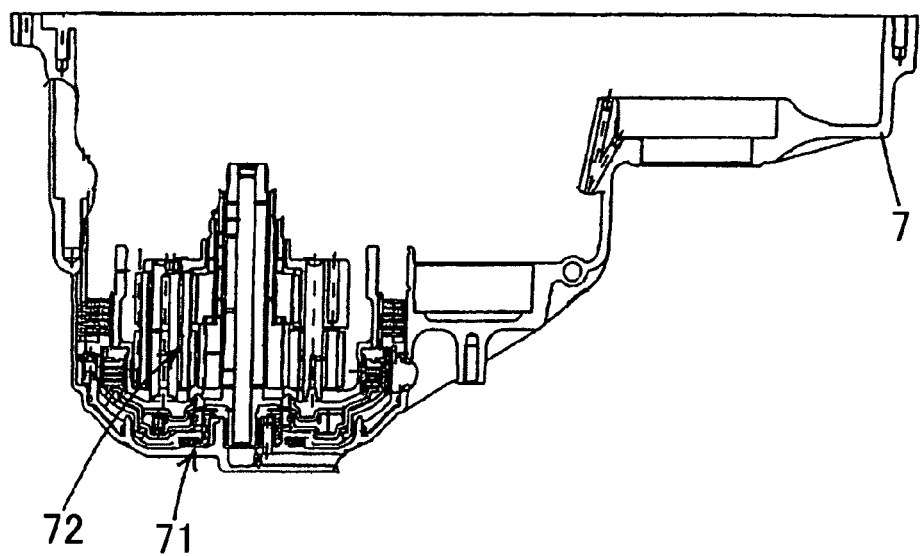
FIG. 6 is a drawing that shows a rear sub-installation state according to an exemplary embodiment.

In the subsidiary operation SL2, the rear sub-assembly 72, which structures a portion of the shifting gear, a clutch portion, and the brake portion, is assembled. In the rear sub-assembly 72, bearings, spacers, a planetary gear assembly, and a brake plate are installed around the shaft of the clutch portion, and these are held by an installation jig. In the main operation ML2, the rear sub-assembly 72 is installed in the case 7, and the workpiece is then in the rear sub-installation state that is shown in FIG. 6.

The next main operation ML3 is an operation step in which dimensions are confirmed and parts are selected, and does not require any subsidiary operations. Specifically, the operator 9, who carries out the main operation, uses a plate thickness measuring jig, and measures the thickness of the B2 brake shown in FIG. 7. At this time, in order to suppress warping of the friction members of the multi-plate brake, the overall thickness of the brake is measured while compressing the jig. Next, based on the results of the measurement, a packing plate 73 having the appropriate thickness is selected so as to offset the individual differences in the thickness of the brakes. Thereby, the individual differences present during the brake manufacture can be compensated, and it is possible to make the pull of the brakes uniform.

Figure 8:
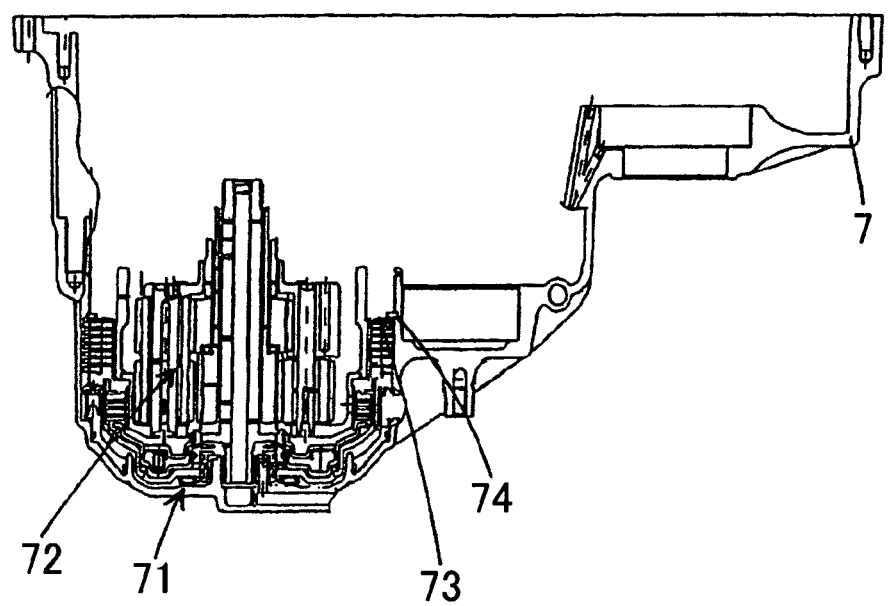
FIG. 8 is a drawing that shows the backing plate installation state according to an exemplary embodiment.

In the next subsidiary operation SL4, the snap ring 74 is prepared. The snap ring 74 that is used here is a type that fits into a groove in the inner surface of a cylinder, and it is necessary to make the outer diameter of the snap ring 74 smaller than the cylinder diameter by using a snap ring positioning jig. Furthermore, because this structure is not rotationally symmetric, in the jig, the alignment (the angle in the circumferential direction in the cylinder) during installation is also adjusted. In the main operation ML4, the backing plate 73 that was selected in the previous step is incorporated, and the snap ring 74 that was received from subsidiary operation ML4 is inserted. As a result, the workpiece is then in the backing plate installation state that is shown in FIG. 8.

Figure 9:
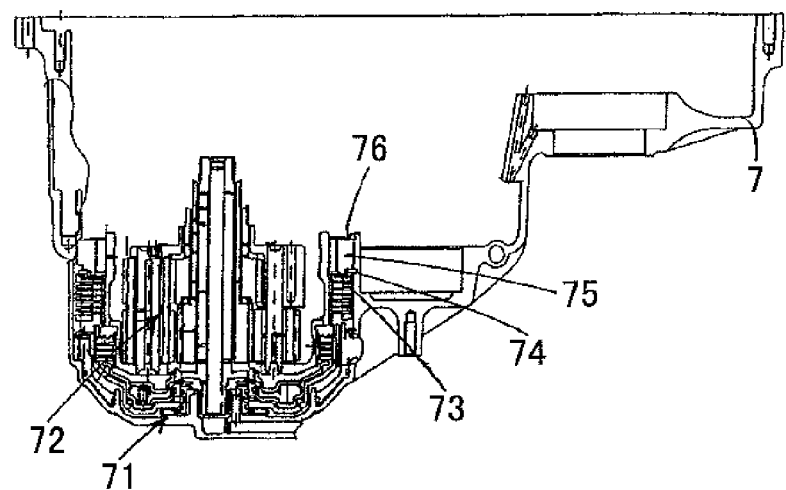
FIG. 9 is a drawing that shows the one-way-clutch installation state according to an exemplary embodiment.
Figure 10:
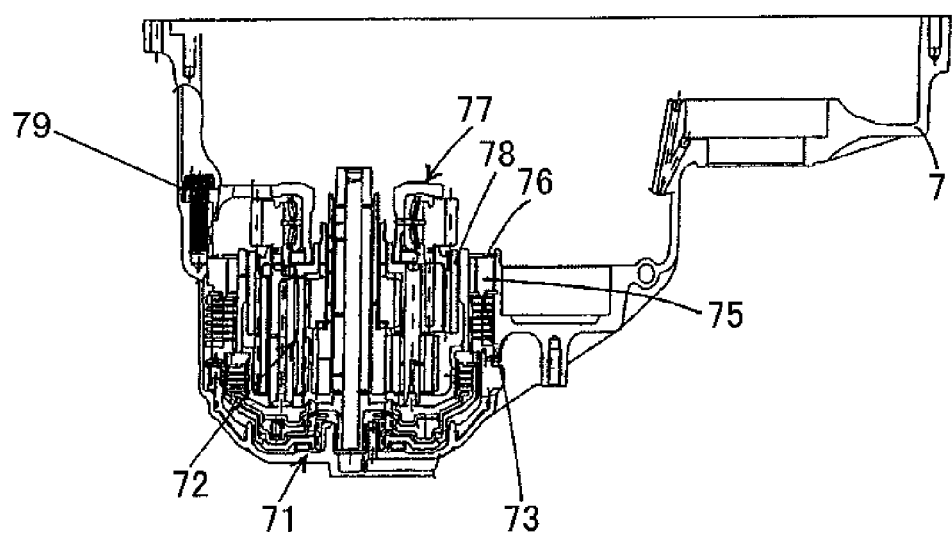
FIG. 10 is a drawing that shows a counter gear installation state according to an exemplary embodiment.

In subsidiary operation SL5, the one-way-clutch 75 and the snap ring 76 are set in the snap ring diameter reduction jig. Similarly to the previous step, the reduction of the diameter and alignment adjustment of the snap ring 76 are carried out. In the main operation ML5, the one-way-clutch 75 and the snap ring 76 are installed. At this time, because a jig is used, it is possible to install both parts at one time, and the operation efficiency is high. As a result, the workpiece is then in the one-way-clutch installation state that is shown in FIG. 9.

In subsidiary operation SL6, the counter gear assembly 77 is assembled. In the main operation ML6, first, the center support 78 is inserted. Next, the counter gear assembly 77 is incorporated, and the bolt 79 is tightened and fastened. The tightening of the bolt 79 is carried out by using an electric screw driver on the stationary station side. As a result, the workpiece is then in the counter gear installation state shown in FIG. 10.

Figure 11:
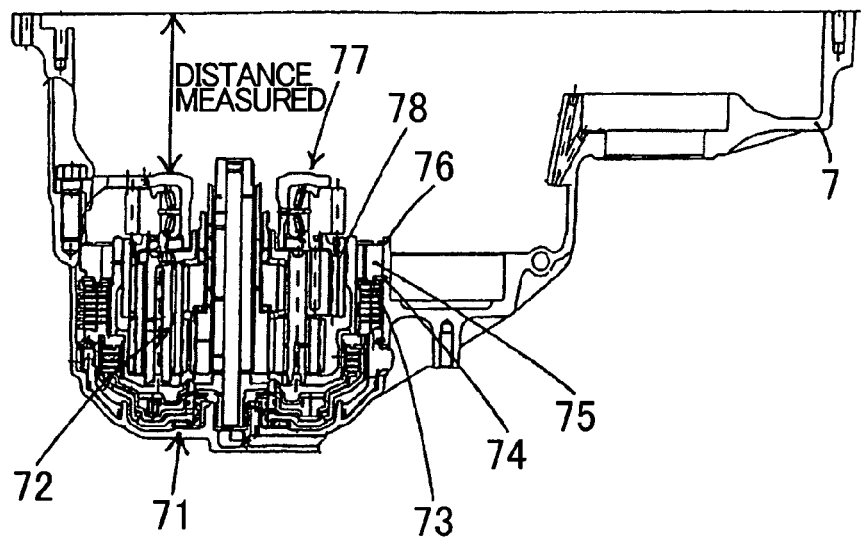
FIG. 11 is an explanatory drawing that shows the method in which the inclination of the counter gear is measured according to an exemplary embodiment.

The next main operation ML7 is an operation step in which the dimensions are confirmed, and this does not require a subsidiary operation. Specifically, as shown in FIG. 11, the distance between the upper end of the counter gear assembly 77 and the upper end of the case 7 is measured. At this time, the measurement is carried out while rotating the counter gear one time, and it is confirmed whether the counter gear assembly 77 is installed at an angle. In order to carry this out with a high efficiency, a measuring apparatus is used that has an automatic measuring function that intermittently measures at short intervals and a processing function that finds, for example, the average value of the measured data.

Figure 12:
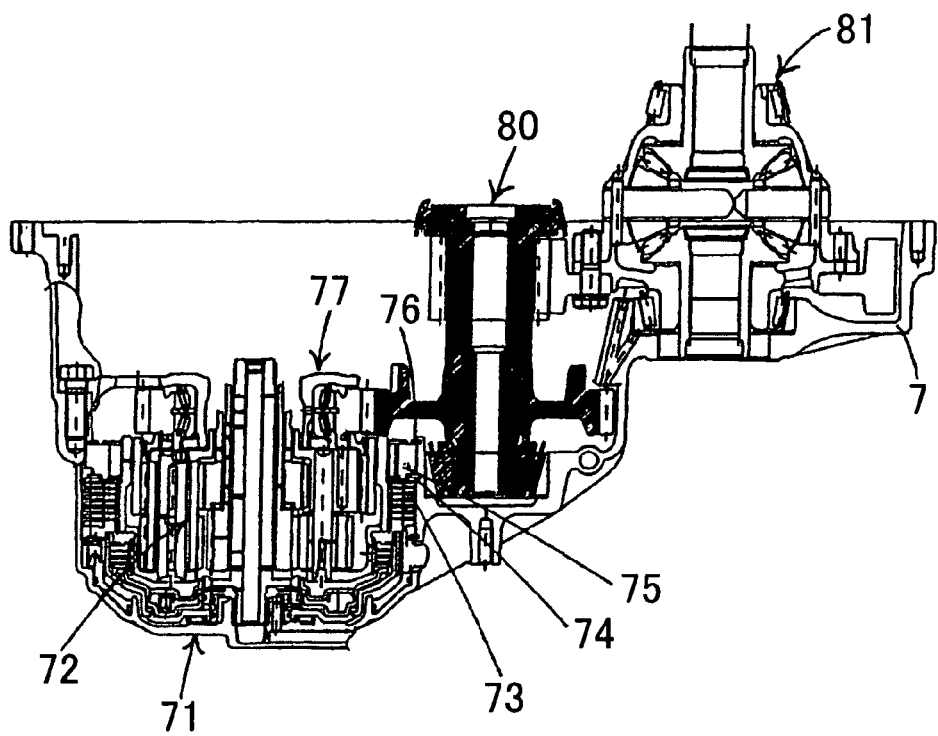
FIG. 12 is a drawing that shows a differential installation state in according to an exemplary embodiment.
Figure 13:
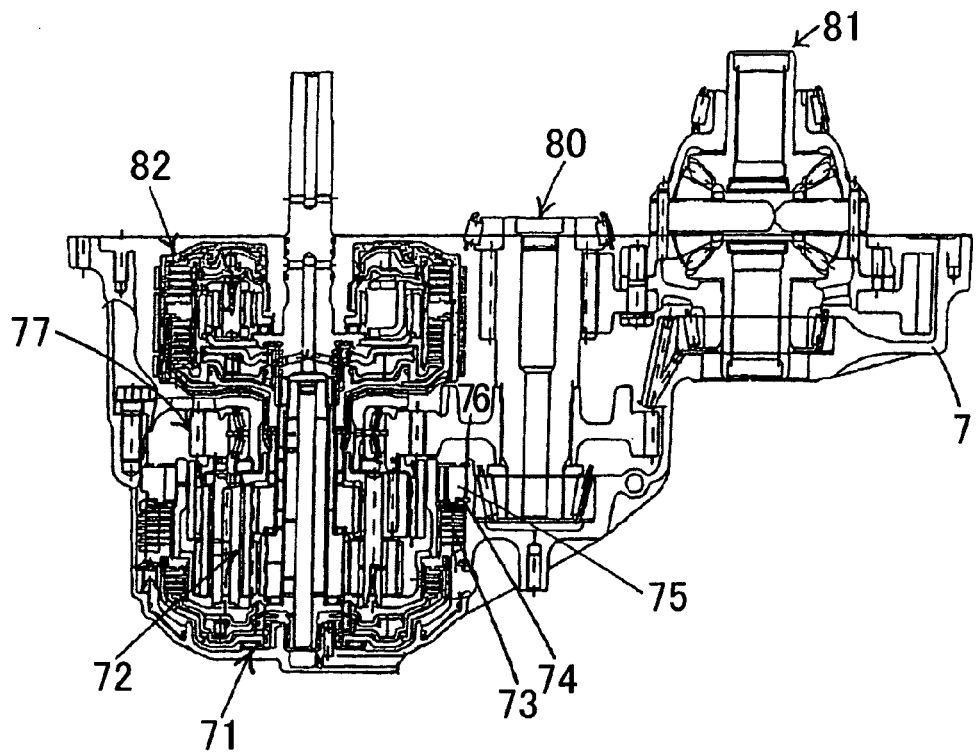
FIG. 13 is a drawing that shows a front sub-installation state according to an exemplary embodiment.

In the next subsidiary operation SL8, the drive pinion assembly 80 and the diff assembly (differential apparatus assembly) 81 are assembled. In the main operation ML8, the two assemblies 80 and 81 are installed, and the workpiece is then in the differential installation state that is shown in FIG. 12.

In subsidiary operation SL9, the front sub-assembly 82 and the C3 assembly (clutch portion) are assembled. In the main operation ML9, the front pre-assembly 80 and the C3 assembly are installed in the case 7, and then the drive sun gear and the B1 band brake are installed. As a result, the workpiece is in the front sub-installation state shown in FIG. 13.

Figure 14:
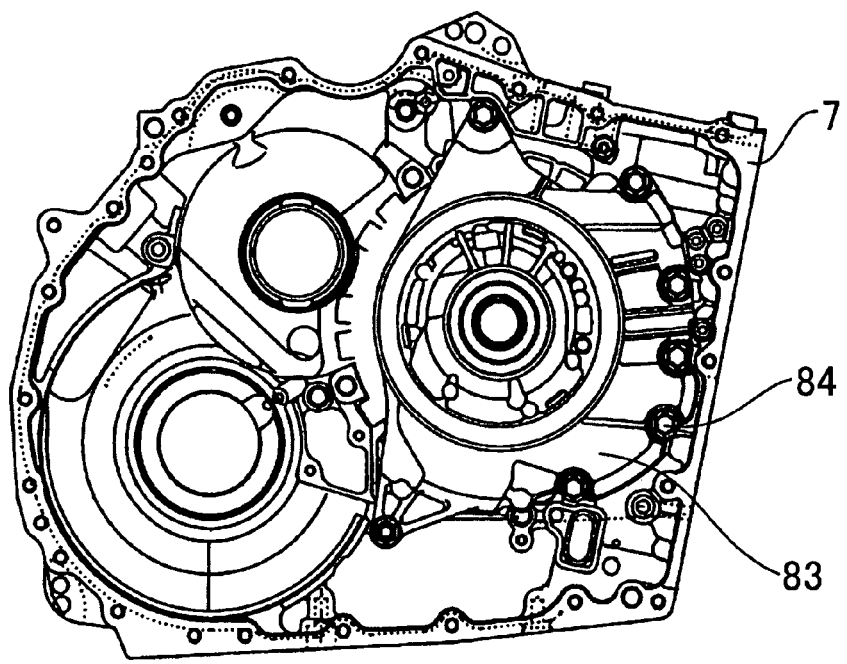
FIG. 14 is an explanatory drawing that shows the method in which an oil pump is installed according to an exemplary embodiment.
Figure 15:
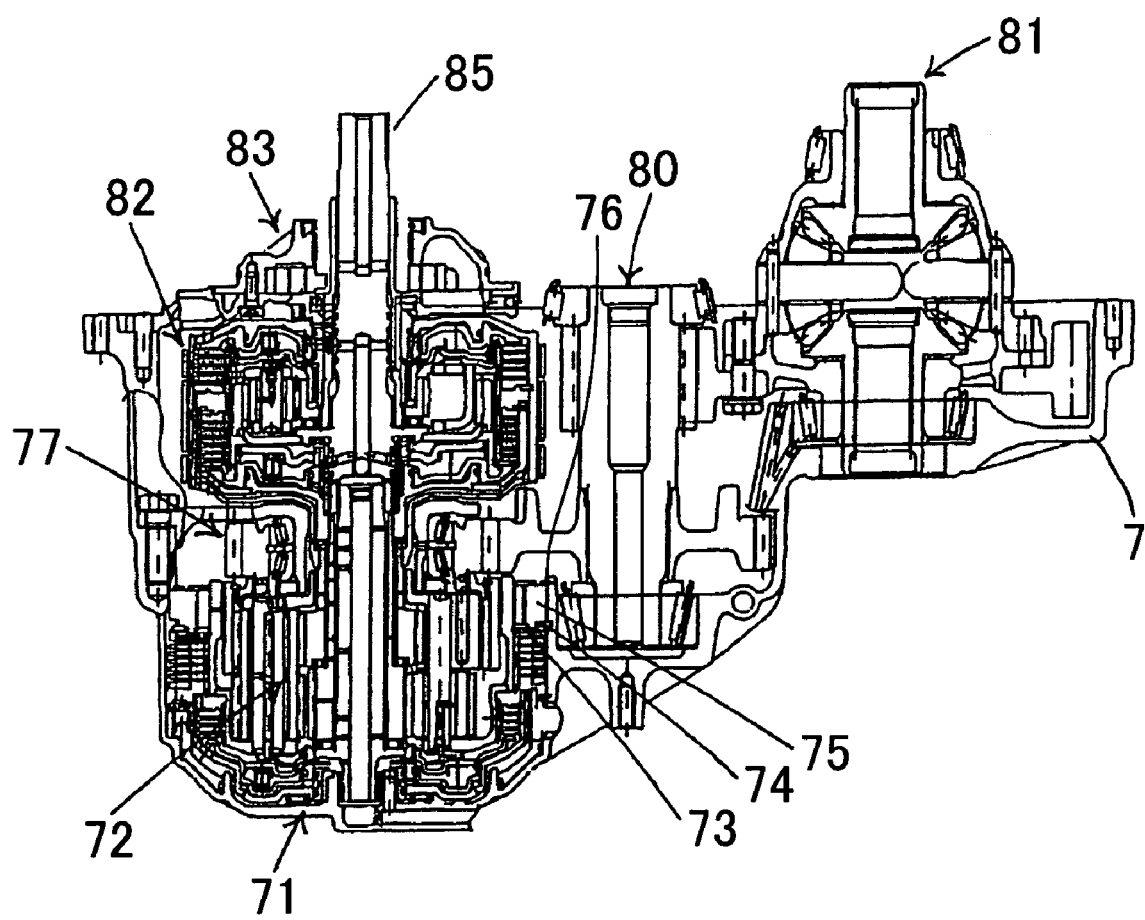
FIG. 15 is a drawing that shows the oil pump installation state according to an exemplary embodiment.

Next, in the subsidiary operation SL10, the oil pump assembly 83 is assembled. In the main operation ML10, seven bolts 84 shown in FIG. 14 are simultaneously partially tightened by using a bolt partial-tightening jig. Finally, the tightening is manually increased, but the operational efficiency can be greatly improved by using a temporary bolt tightening jig. As a result, the workpiece is in the oil pump installation state shown in FIG. 15.

In the main operation ML11, the shaft 85 is raised upward, the dimension of possible movement is measured, and it is confirmed that there is no deficiency in the parts around the shaft.

In the main operation ML12, using a band brake stroke measuring jig, the stroke of the B1 band brake is measured. With this jig, the displacement is found by pressing the engagement convexity of the B1 band brake, and the particular stroke of each brake is found.

In main operation ML13, the B1 piston assembly is installed, and the transmission is complete.

All of the operation steps are completed and the main car 2 and the subsidiary car 4 reach the export station So. Here, the completed transmission is exported by a separate conveying device, and it is delivered to the inspection step. Subsequently, the main car 2 and the subsidiary car 4 continue traveling along the circular routes 11 and 12, and return to the switching station St. Then the new case 7 is mounted and the next manufacturing cycle starts.

In the transmission production facility 1 of the exemplary embodiments, the main car 2 and the subsidiary car 4 travel together, and the operation steps are divided and carried out. Thereby, it is possible to make a rational manufacturing method in which two operators 9 cooperate to manufacture one product. In addition, the amount of stored parts can be minimized, and it is possible to respond to the production of a single item or to perform a mixed production in which a plurality of models is fabricated. Furthermore, even if the production model changes, there is the effect that it is possible to reconfigure the production line in a short period of time.

In addition, other than the travel of the cars and electric screw drivers, in the production facility, the use of additional power sources such as electrical power and compressed air is reduced whenever possible. Thus, far fewer actuators may be used than in a conventional facility and a reduction in energy consumption becomes possible. Furthermore, it will be appreciated that the space required for the operations is reduced.

Next, various means and aspects are added in order to facilitate the transfer of parts and/or jigs between the main car 2 and the subsidiary car 4 in the exemplary embodiments. These exemplary embodiments will be further explained.

Figure 19:
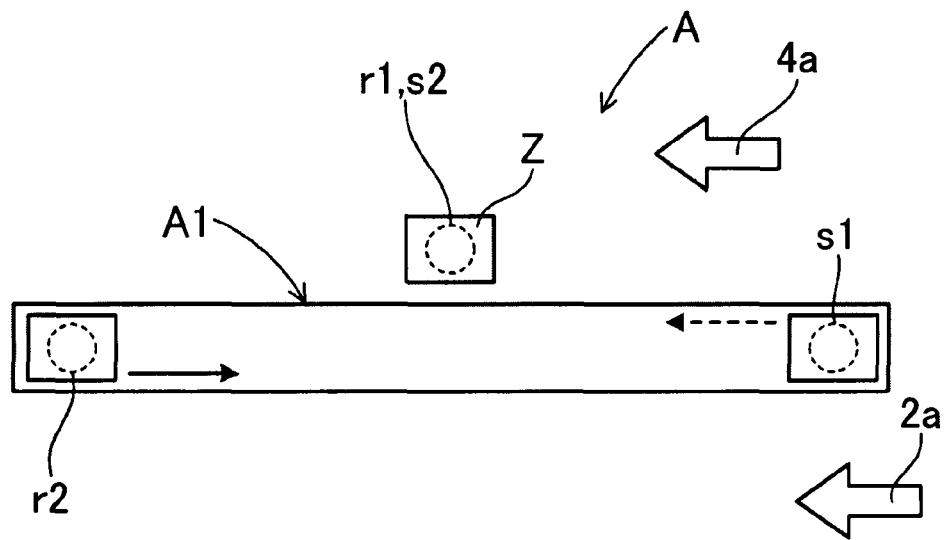
FIG. 19 is an explanatory drawing that shows the structure of a transfer apparatus according to an exemplary embodiment.

In an exemplary embodiment, as shown in FIG. 19, at least a portion of the operation in which parts and/or jigs are transferred between the main car 2 and the subsidiary car 4 is carried out by using the transfer apparatus A.

As shown in FIG. 19, the transfer apparatus A is provided with a delivery apparatus A1, which serves as main delivery means that delivers the parts and/or jigs that have been disposed at a second receiving position r2 to a first serving position s1, among the first serving position s1, at which the parts and/or jigs are transferred to the subsidiary car 4, the first receiving position r1, at which the parts and/or jigs are received from the subsidiary car 4, the second serving position s2, at which the parts and/or jigs are transferred to the main car 2, and the second receiving position r2, at which the parts and/or jigs are received from the main car 2. Furthermore, the transfer apparatus A is provided with a stationary mounting platform Z that doubles as the first receiving position r1 and the second serving position s2.

Figure 17A:
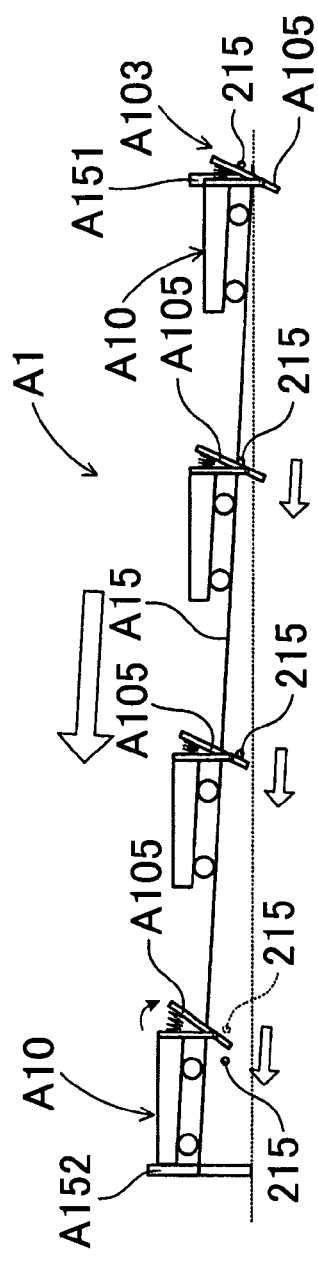
FIG. 17 is (a) a side view that shows the state in which a mounting platform is moving forward, and (b) a planar view that shows the state in which the mounting platform is moving forward according to an exemplary embodiment.
Figure 17B:
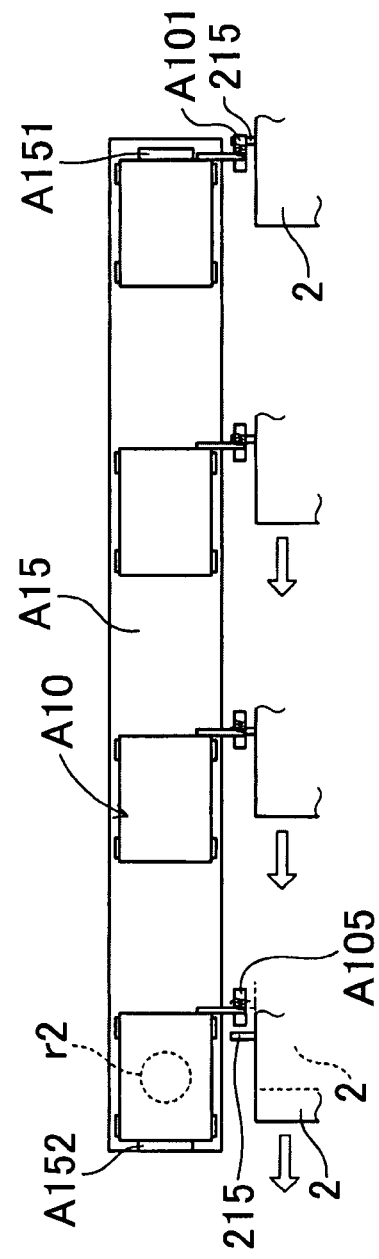
Figure 18A:
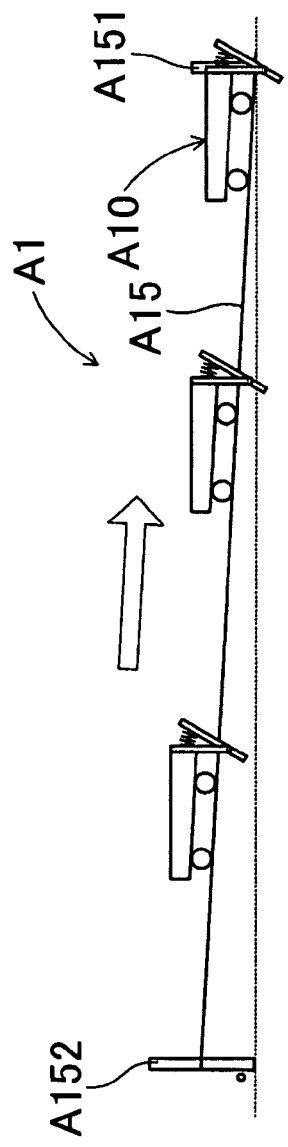
FIG. 18 is a (a) a side view that shows the state in which the mounting platform is moving backward, and (b) a planar view that shows the state in which the mounting platform is moving backward according to an exemplary embodiment.
Figure 18B:
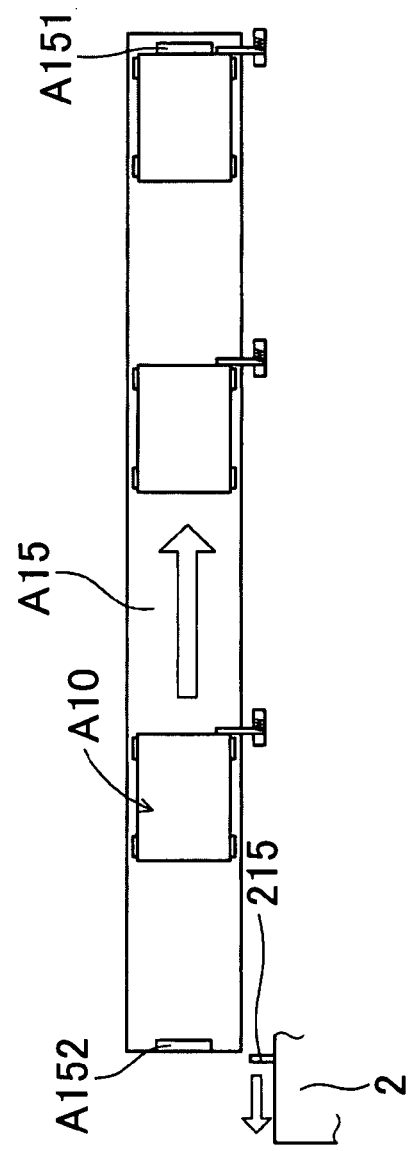

The delivery apparatus A1 can be used when an operation is carried out that is similar to the case in which the subsidiary operation SL2 in FIG. 3 described above is carried out. As shown in FIG. 16 to FIG. 18, the delivery apparatus A1 has a movable mounting platform A10 that can move between the first serving position s1 and the second receiving position r2.

The mounting table A10 is disposed so as to be able to move along an inclined path A15 that is inclined such that the height increases as the second receiving position r2 is approached from the first serving position s1. In addition, the mounting platform A10 is structured such that, from the first serving position s1 to the second receiving position r2, it is linked to the main car 2 and moves in synchrony therewith, and by releasing the link with the main car 2 at the second receiving position r2, the mounting platform A10 moves along the inclined path A15 under its own weight, and returns to the first serving position s1 to stand-by.

More specifically, as shown in FIG. 16 to FIG. 18, stoppers A151 and A152 are disposed on both ends of the inclined path A15, and the mounting platform A10 is disposed so as to be able to travel between these stoppers. Due to the influence of the inclination of the inclined path A15, normally the back end of the mounting platform A10 abuts the stopper A151, that is, it stands by at the lowest point.

The mounting platform A10 includes four wheels A102 that can freely rotate and a platform body A101 that is disposed above the same. A linking member A103 for linking with the main car 2 is disposed on the mounting platform body A101.

The linking member A103 is structured by a base plate A104 that is disposed in a perpendicular direction with respect to the mounting platform, an abutting plate A105 that is disposed so as to be able to rotate with respect to the base plate A104 centered on the hinge A109, and a spring A108 that is disposed between base plate A104 and the abutting plate A105. In the case in which the abutting plate A105 is disposed at a position that can abut an engaging rod 215 disposed in the main car 2 and the mounting platform A10 is positioned at the highest point and abuts the stopper A152, the positional relationship is adjusted such that the abutting position between the abutting plate A105 and the engaging rod 215 is lower than the hinge A109.

Using the transfer apparatus A, which has the delivery apparatus A1 with the structure described above, a part that has been set in a designated jig is transferred from the subsidiary car 4 to the main car 2, and only the jigs that are no longer in use are returned from the main car 2 to the original position. This sequence of actions is explained by using FIG. 16 to FIG. 18 and FIG. 19.

First, as shown in FIG. 19, the subsidiary car 4 is moved in the direction of the arrow 4a, the main car 2 moves in the direction of the arrow 2a in back thereof. The transfer apparatus A is disposed so as to be interposed between these cars.

Then, as shown in FIG. 19, when the subsidiary car 4 is positioned at the side of the first serving position s1, that is, positioned at the side of the mounting platform A10, which is positioned at the lowest point of the delivery apparatus A1, the jigs on the mounting platform A10 are transferred to the subsidiary car 4. Subsequently, the subsidiary car 4 moves forward after the transfer of the jig has been completed, but the empty mounting platform A10 continues to stand-by at the first serving position s1, which is at the lowest point.

In the subsidiary car 4, while moving, a subsidiary operation is carried out in which predetermined parts are installed in the jig that has been moved to the first serving position s1. This subsidiary operation is carried out so as to be completed when or by the time that the subsidiary car 4 has reached the side of the stationary mounting platform Z, and the jig having a part set thereon moved from the subsidiary car 4 to the first receiving position r1 on the stationary mounting platform Z.

In contrast, as shown in FIG. 19, the main car 4 moves forward in back of the subsidiary car 4 in the direction of the arrow 2a. At the point in time that the main car 2 has reached the side of the mounting platform A10, which is positioned at the lowest point on the transfer apparatus A1, as shown in FIG. 16 and FIG. 17, the engaging rod 215 described above abuts the abutting plate A105 of the mounting platform A10, subsequently the mounting platform A10 is linked to the movement of the main car 2, and the mounting platform A10 moves forward.

As shown in FIG. 19, when the main car 2 is positioned at the side of the second serving position s2, that is, at the side of the stationary mounting platform Z, the jig on which the part that was assembled by the prior subsidiary operation is moved to the main car 2. Subsequently, the main car 2 moves forward, but the empty mounting platform A10 continues to move in synchrony with the main car 2.

In the main car 2, while moving, the main operation is carried out in which the part that is set on the received jig is installed in the workpiece. This main operation is carried out so as to be completed when or by the time that the mounting platform A10, which moves in synchrony with the main car 2, has reached the highest point. Then, the jig that is no longer in use is moved onto the mounting platform A10 from the main car 2 when or by the time that the mounting platform A10, which is moving in synchrony with the main car 2, has reached the highest point.

As shown in FIG. 17 and FIG. 18, when the mounting platform A10, which is moving in synchrony with the main car 2, has reached the second receiving position r2, which is at the highest point, and abuts the stopper A152, and the engaging rod 215 of the main car 2, which continues to move forward, is pressed and is rotated due to the abutting plate A105 overcoming the resistance of the spring A108, the engaged state is released. Thus, as shown in FIG. 18, the mounting platform A10 on which the jig has been mounted moves under its own weight from the second receiving position r2, which is at the highest point, to the first serving position s1, which is at the lowest point, and returns to the stand-by state.

It is possible to repeatedly carry out the transfer operation by such a sequence of actions.

Next, a further exemplary embodiment will be explained in which the positional relationships between the transfer positions in the transfer apparatus, that is, the positional relationships between the first serving position s1, the first receiving position r1, the second serving position s2, and the second receiving position r2, have been modified.

Figure 20:
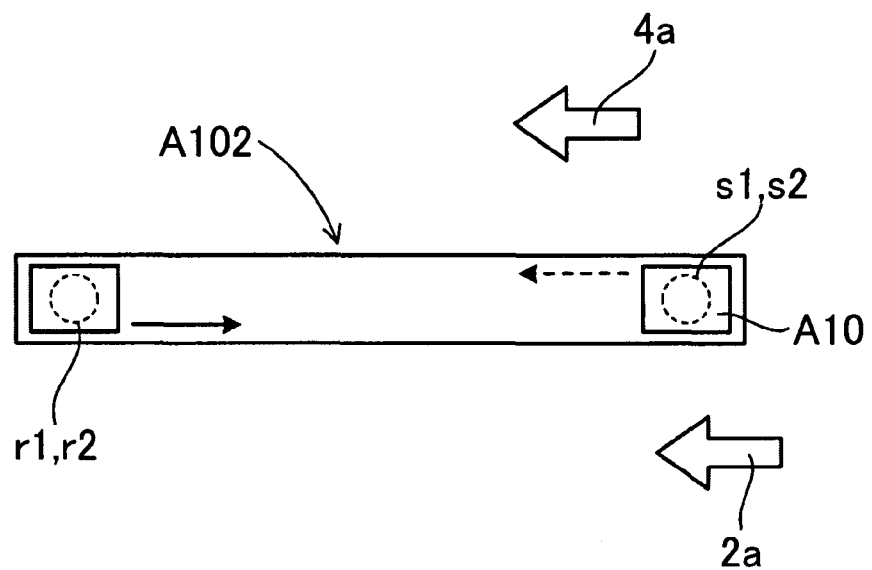
FIG. 20 is an explanatory drawing that shows the structure of a transfer apparatus according to a further exemplary embodiment.

As shown in FIG. 20, the present exemplary embodiment is one in which the first serving position s1 and the second serving position s2 are the same position and the first receiving position r1 and the second receiving position r2 are the same position. In particular, in this example, the second serving position s2 is characterized in being disposed more toward the back side than the first receiving position r1 in the direction of forward movement of the main car 2. Thereby, when designing the overall facility, it is possible to substantially shorten the facility by an amount equivalent to the distance between the second serving position s2 and the first receiving position r1, the design freedom is increased, and a more compact facility is easily realized.

The basic structure of the delivery apparatus A102 that is used in this example is similar to that of the delivery apparatus A1 described above, but the delivery apparatus A102 provides the function of main delivery means that delivers parts and/or jigs disposed at the first receiving position r1 to the first serving position s1, and also provides the function of subsidiary delivery means that delivers parts and/or jigs disposed at the first receiving position r1 to the second serving position s2. The mounting platform A10 of the delivery apparatus A102 has linking members A103 of the mounting platform A10 in the delivery apparatus A1 described above, on both the left and right sides, and is structured so as to move in synchrony with a subsidiary car 4 and a main car 2.

In this case, as shown in FIG. 20, when the subsidiary car 4, which moves in the direction of the arrow 4a, is positioned at the side of the first serving position s1, that is, is positioned at the side of the mounting platform A10, which is positioned at the lowest point of the delivery apparatus A102, the jigs on the mounting platform A10 are moved to the subsidiary car 4. Then, from this point in time, the mounting platform A10 and the subsidiary car 4 move forward in synchrony.

In the subsidiary car 4, subsidiary operations similar to those described above are carried out while moving. In addition, when or by the time that the mounting platform A10, which is moving in synchrony with the subsidiary car 4, has reached the highest point, the jig, in which the part has been installed, is moved from the subsidiary car 4 onto the mounting platform A10. In addition, when the mounting platform A10, which is moving in synchrony with the subsidiary car 4, has reached the first receiving position r1, which is at the highest point, the state of engagement with the subsidiary car 4 is released. Thereby, the mounting platform A10, on which the parts and/or jigs have been mounted, moves from the first receiving position r1, which is at the highest point, to the second serving position s2, which is at the lowest point (a position that is the same as the first serving position s1) under its own weight, and returns to a stand-by state.

Subsequently, when the main car 2, which is moving in the direction of the second arrow 2a, is positioned at the side of the second serving position s2, which is on the mounting platform A10 that is positioned at the lowest point of the delivery apparatus A102, the parts and/or jigs on the mounting platform A10 are moved to the main car 2. In addition, from this point in time the mounting platform A10 moves forward in synchrony with the main car 2.

At the main car 2, main operations similar to those described above are carried out. Then, when or by the time that the mounting platform A10, which is moving in synchrony with the main car 2, has reached the highest point, the jigs that are no longer in use are moved from the main car 2 onto the mounting platform A10. In addition, when the mounting platform A10, which is moving in synchrony with the main car 2, has reached the second receiving position r2, which is at the highest point, the state of engagement with the main car 2 is released. Thereby, the mounting platform A10, on which the jigs have been mounted, moves under its own weight from the second receiving position r2, which is at the highest point, to the first serving position s1, which is at the lowest point, and returns to the stand-by state.

In this example as well, it is possible to carry out the transfer operation repeatedly by the sequence of actions described above.

Figure 21:
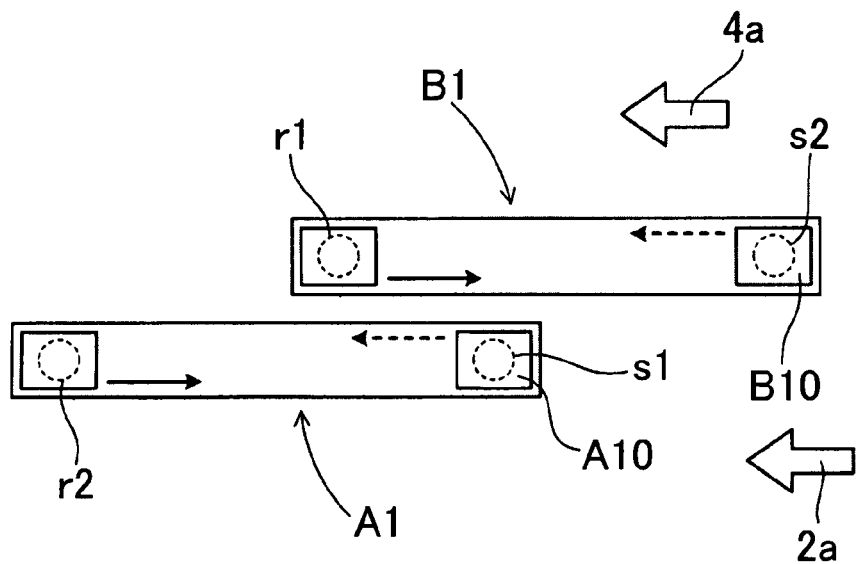
FIG. 21 is an explanatory drawing that shows the structure of a transfer apparatus according to a further exemplary embodiment.

As shown in FIG. 21, a further exemplary embodiment is explained in which the first serving position s1, the second serving position s2, the first receiving position r1, and the second receiving position r2 are all set at separate positions in the direction of forward movement. In this example as well, the second serving position s2 is set on a side farther to the back than the first receiving position r1 in the direction of forward travel of the main car 2. Thereby, when designing the overall facility, it is possible to substantially shorten the facility by an amount equivalent to the distance between the second serving position s2 and the first receiving position r1, the design freedom is increased, and a more compact facility is easily realized.

The transfer apparatus that is used in this example is provided with a delivery apparatus A1 (for the convenience of explanation, as necessary, here and below parts with identical functions have identical reference numerals) that has a basic structure similar to that of the delivery apparatus A1 described above and that functions as main delivery means, and delivery means B1 that functions as subsidiary delivery means. The delivery means B1 has a basic structure that is similar to the delivery apparatus A1 that has been described above, and the mounting platform B10 is structured so as to be able to move in synchrony with the subsidiary car 4 due to a linking mechanism that is similar to the one that has been described above.

In this case, as shown in FIG. 21, from the point in time that the subsidiary car 4, which moves in the direction of the arrow 4a, is positioned at the side of the second serving position s2, that is, at the side of the mounting platform B10, which is at the lowest point of the delivery apparatus B1, the mounting platform B10 moves forward in synchrony with the subsidiary car 4.

When the subsidiary car 4, which has moved farther, is positioned at the side of the first serving position s1, that is, at the side of the mounting platform A10, which is positioned at the lowest point of the delivery apparatus A1, the jigs on the mounting platform A10 are moved to the subsidiary car 4.

In the subsidiary car 4, a subsidiary operation that is similar to that described above is carried out while moving farther. Then, when or by the time that the mounting platform B10, which is moving in synchrony with the subsidiary car 4, has reached the highest point, the jigs on which the parts have been installed are moved from the subsidiary car 4 to the mounting platform B10. In addition, when the mounting platform B10, which is moving in synchrony with the subsidiary car 4, has reached the first receiving position r1, which is at the highest point, the state of engagement with the subsidiary car 4 is released. Thereby, the mounting platform B10, on which the parts and/or jigs have been mounted, moves under its own weight from the first receiving position r1, which is at the highest point, to the second serving position s2, which is at the lowest point, and returns to the stand-by state.

Subsequently, when the main car 2, which moves in the direction of the arrow 2a, is positioned at the side of the second serving position s2, which is on the mounting platform B1 that is positioned at the lowest point of the delivery apparatus B1, the jigs and parts on the mounting platform B10 are moved to the main car 2.

At the main car 2, a main operation that is similar to that described above is carried out while traveling. Then, from the point in time that the main car 2 has reached the side of the mounting platform A10 that is positioned at the first serving position s1, which is at the lowest point of the delivery apparatus A1, the mounting platform A10 is linked to the main car 2, and moves forward in synchrony therewith.

In the main car 2, the main operation continues, and when or by the time that the mounting platform A10, which is moving in synchrony with the main car 2, has reached the highest point, the jigs that are no longer in use are moved from the main car 2 onto the mounting platform A10. In addition, when the mounting platform A10, which is moving in synchrony with the main car 2, has reached the second receiving position r2, which is at the highest point of the delivery apparatus A1, the state of engagement with the main car 2 is released. Thereby, the mounting platform A10 on which the jigs have been mounted moves under its own weight from the second receiving position r2, which is at the highest point, to the first serving position s1, which is at the lowest point, and returns to the stand-by state.

In this example as well, the transfer operation can be carried out repeatedly by the sequence of actions described above.

Figure 22:
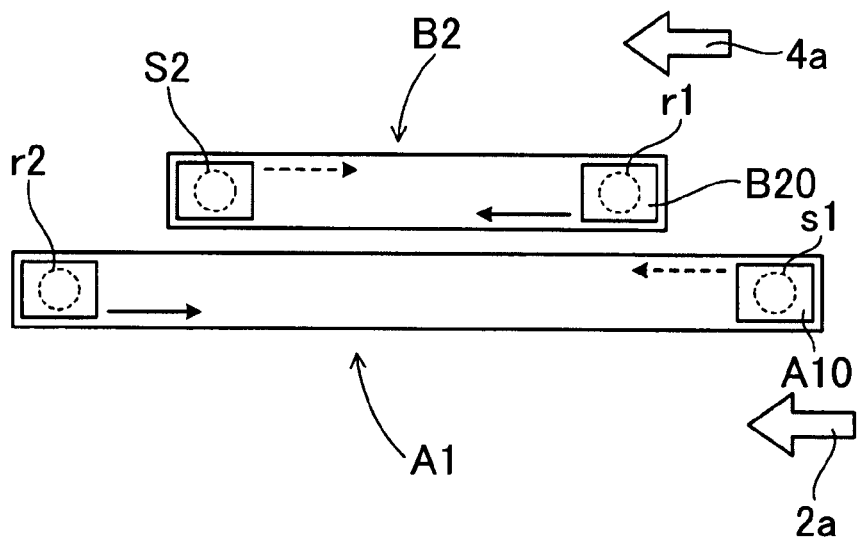
FIG. 22 is an explanatory drawing that shows the structure of a transfer apparatus according to a further exemplary embodiment.

As shown in FIG. 22, a further exemplary embodiment is provided in which the first serving position s1, the second serving position s2, the first receiving position r1, and the second receiving position r2 are all positioned separately, but the order differs from the case of FIG. 21.

The transfer apparatus used in this example is structured by a delivery apparatus A1 has a basic structure that is similar that of the one described above and functions as a main delivery means and a delivery apparatus B2 that has in addition a function of holding and a function of releasing a mounting platform at the highest point, and functions as a subsidiary delivery means.

In this case, as shown in FIG. 22, when the subsidiary car 4, which moves in the direction of the arrow 4a, has reached the side of the first serving position s1, that is along the side of the mounting platform A10, which is at the lowest point of the delivery apparatus A1, the jigs on the mounting platform A10 are moved to the subsidiary car 4. Subsequently, the subsidiary car 4 moves forward, but the empty mounting platform A10 continues to stand-by after the transfer of the jigs has been completed at the first serving position s1, which is at the lowest point of the delivery apparatus A1.

In the subsidiary car 4, the subsidiary operation is carried out while moving. In addition, when the subsidiary car 4, which has moved farther, is positioned at the side of the first receiving position r1, that is, at the side of the mounting platform B20, which is positioned at the lowest point of the delivery apparatus B2, the jigs and/or parts that have finished being used in the subsidiary operation are moved onto the first receiving position r1. In addition, from this point in time, the mounting platform B20 starts moving forward in synchrony with the subsidiary car 4. Then, at the point in time at which this mounting platform B20 has reached the second serving position s2, which is at the highest point of the delivery apparatus B2, the state of engagement with the subsidiary car 4 is released. Here, in this delivery apparatus B2, until the operator of the main car 2 operates the release lever B27 (refer to FIG. 29 explained below), and the main car 2 stands by at the second serving position s2.

In contrast, at the point in time in which the main car 2 has reached the side of the mounting platform A10, which is positioned at the first serving position s1, the main car 2 is linked to the mounting platform A10, and moves forward along with the empty mounting platform A10.

When the main car 2 is positioned at the side of the second serving position s2, that is, the side of the highest point of the delivery apparatus B2, the jigs having the parts set therein are moved from the second serving position s2 to the main car 2. Then, by operating the release lever B27 in the delivery apparatus B2, the mounting platform B20 travels automatically to the lowest point.

Subsequently, the main car 2 moves forward, but the empty mounting platform A10 continues to move in synchrony with the main car 2. At the main car 2, the main operation is carried out while moving. This main operation is carried out so as to be completed when or by the time that the mounting platform A10, which is moving in synchrony with the main car 2, has reached the highest point. Then, when or by the time that the mounting platform A10, which is moving in synchrony with the main car 2, has reached the highest point, the jigs that are no longer in use are moved from the main car 2 onto the mounting platform A10. In addition, when the mounting platform A10, which is moving in synchrony with the main car 2, has reached the second receiving position r2, which is at the highest point of the delivery apparatus A1, the state of engagement with the main car 2 is released. Thereby, the mounting platform A10, on which the jigs have been mounted, moves under its own weight from the second receiving position r2, which is at the highest point, to the first serving position s1, which is at the lowest point, and returns to the stand-by state.

In this example as well, the transfer operation can be carried out repeatedly by the sequence of actions described above.

Figure 23:
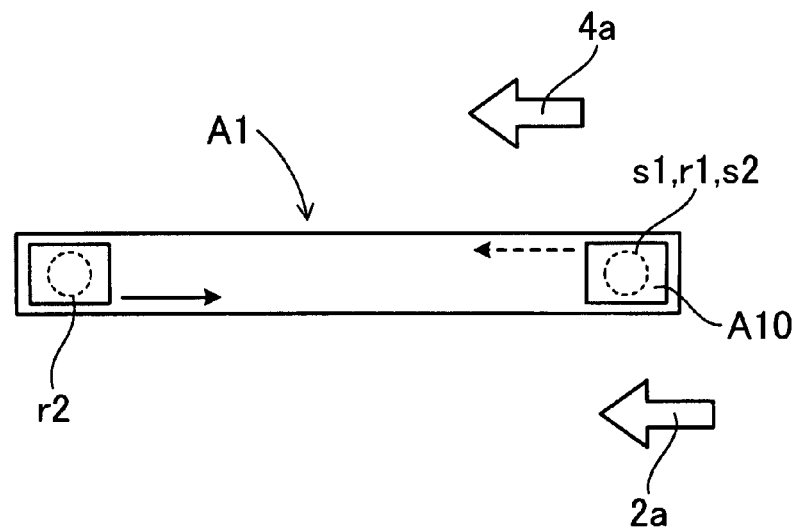
FIG. 23 is an explanatory drawing that shows the structure of a transfer apparatus according to a further exemplary embodiment.

As shown in FIG. 23, a further exemplary embodiment is provided in which a subsidiary operation in a subsidiary car 4 is carried out while it is stopped, whereas a main operation in a main car 2 is carried out while traveling. Specifically, in this example, the first serving position s1 and the first receiving position r1 are at the same position, and furthermore, the second serving position s2 is also at the same position. In addition, in this example, a delivery apparatus A1 is used that has a basic structure that is similar to the one described above and functions as a main delivery means.

As shown in FIG. 23, when the subsidiary car 4, which moves in the direction of the arrow 4a, is positioned at the side of the first serving position s1, that is, the side of the mounting platform A10, which is positioned at the lowest point of the delivery apparatus A1, the subsidiary car 4 is stopped, and the jigs on the mounting platform A10 are moved to the subsidiary car 4. Then, in the subsidiary car 4, the subsidiary operation is the same as that described above while stopped. At this time, the main car 2 is in the back, where a separate operation is carried out while it is stopped.

After the subsidiary operation in the subsidiary car 4 has been completed, the jigs that have the parts installed therein are moved from the subsidiary car 4 to the first receiving position r1 (the position that is the same as the first serving position s1) on the mounting platform A10. Subsequently, the subsidiary car 4 starts traveling along with the start of the traveling of the main car 2, which is in back.

When the main car 2, which moves in the direction of the arrow 2a, is positioned at the side of the second serving position s2 (the same position as the first serving position s1 and the first receiving position r1), which is on the mounting platform A10 that is positioned at the lowest point of the delivery apparatus A1, the jigs and parts on the mounting platform A10 are moved to the main car 2. In addition, from this point in time, the mounting platform A10 is linked to the main car 2, and moves forward synchronously therewith.

At the main car 2, the main operation continues while moving, and when or by the time that the mounting platform A10, which is moving in synchrony with the main car 2, has reached the highest point of the mounting platform A10, the jigs that are no longer in use are moved from the main car 2 onto the mounting platform A10. In addition, when the mounting platform A10, which is moving in synchrony with the main car 2, has reached the second receiving position r2, which is at the highest point of the delivery apparatus A1, the state of engagement with the main car 2 is released. Thereby, the mounting platform A10, on which the jigs have been mounted, moves under its own weight from the second receiving position r2, which is the highest point, to the first serving position s1, which is at the lowest point, and returns to the stand-by state.

In this example as well, the transfer operation can be carried out repeatedly by the sequence of actions described above.

Figure 24:
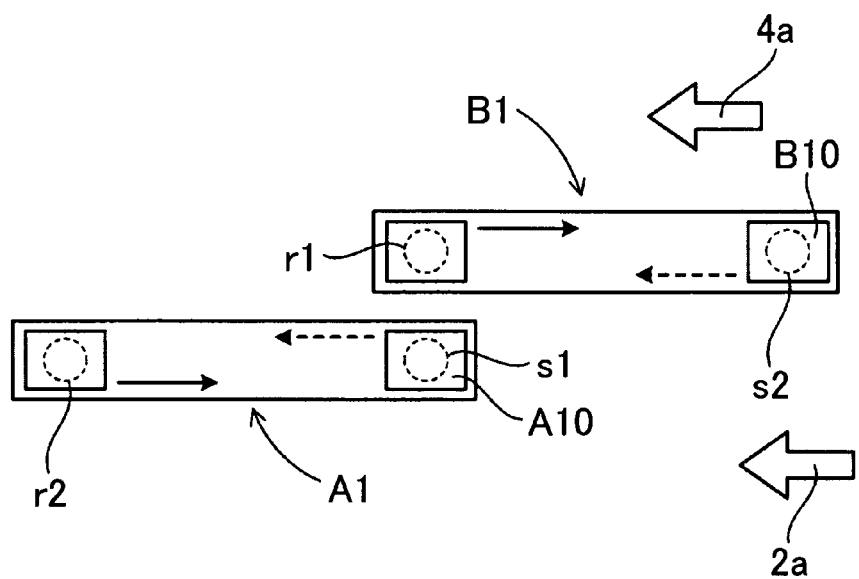
FIG. 24 is an explanatory drawing that shows the structure of a transfer apparatus in a further exemplary embodiment.

As shown in FIG. 24, a further exemplary embodiment is provided in which the subsidiary operation in the subsidiary car 4 is carried out while it is stopped, whereas the main operation in the main car 2 is carried out while traveling. However, although in this example the first serving position s1 and the first receiving position r1 are the same position, the position of the second serving position s2 differs from these. In addition, in this example as well, the second serving position s2 is disposed farther to the back than the first receiving position r1 in the direction of forward movement of the main car 2. Thereby, when designing the overall facility, it is possible to substantially shorten the distance by an amount equivalent to the distance between the second serving position s2 and the first receiving position r1, the design freedom is increased, and a more compact facility is easily realized.

In addition, in this example, a delivery apparatus A1 having a basic structure that is similar to that of the one described above and functions as main delivery means, and a delivery apparatus B1 that functions as subsidiary delivery means are used.

As shown in FIG. 24, after the subsidiary car 4, which is moving in the direction of the arrow 4a, is positioned at the side of the second serving position s2, that is, the side of the mounting platform B10, which is at the lowest point of the delivery apparatus B1, the mounting platform B10 moves forward in synchrony with the subsidiary car 4.

When the subsidiary car 4, which has moved farther, is positioned at the side of the first serving position s1, that is, the side of the mounting platform A10, which is positioned at the lowest point of the delivery apparatus A1, the subsidiary car 4 is stopped, and the jigs on the mounting platform A10 are moved to the subsidiary car 4. In addition, this position is also adjacent to the first receiving position r1, which is at the highest point of the delivery apparatus B1.

At the subsidiary car 4, the subsidiary operation is carried out similarly to that described above while stopped. At this time, the main car 2 is in the back, where a separate operation is carried out while it is stopped.

After the subsidiary operation in the subsidiary car 4 has been completed, the jigs that have the parts installed are moved from the subsidiary car 4 to the first receiving position r1, which is on the mounting platform B10. Subsequently, accompanying the start of travel by the main car 2 in the back, the subsidiary car 4 begins to travel. Accompanying the start of travel by the subsidiary car 4, the state of engagement between the mounting platform B10 and the subsidiary car 4 is released, and the mounting platform B10 on which the jigs have been mounted returns to the second serving position s2, which is at the lowest point of the delivery apparatus B1, to stand-by.

In contrast, when the main car 2, which moves in the direction of the arrow 2a, is positioned at the side of the second serving position s2, which is on the mounting platform B10 that is positioned at the lowest point of the delivery apparatus B1, the jigs and parts on the mounting platform B10 are moved to the main car 2.

In the main car 2, the main operation continues while moving. Then, from the point in time in which the main car 2 has reached the side of the mounting platform A10, which is positioned at the first serving position s1 at the lowest point of the delivery apparatus A1, the mounting platform A10 is linked to the main car 2, and travels in synchrony therewith.

At the main car 2, the main operation continues, and when or by the time that the mounting platform A10, which is moving in synchrony with the main car 2, has reached the highest point, the jigs that are no longer in use are moved from the main car 2 onto the mounting platform A10. In addition, when the mounting platform A10, which is moving in synchrony with the main car 2, has reached the second receiving position r2, which is at the highest point of the delivery apparatus A1, the state of engagement with the main car 2 is released. Thereby, the mounting platform A10 on which the jigs have been mounted moves under its own weight from the second receiving position r2, which is at the highest point, to the first serving position s1, which is at the lowest point, and returns to the stand-by state.

In this example as well, it is possible to carry out the transfer operation repeatedly by the sequence of actions described above.

Figure 25:
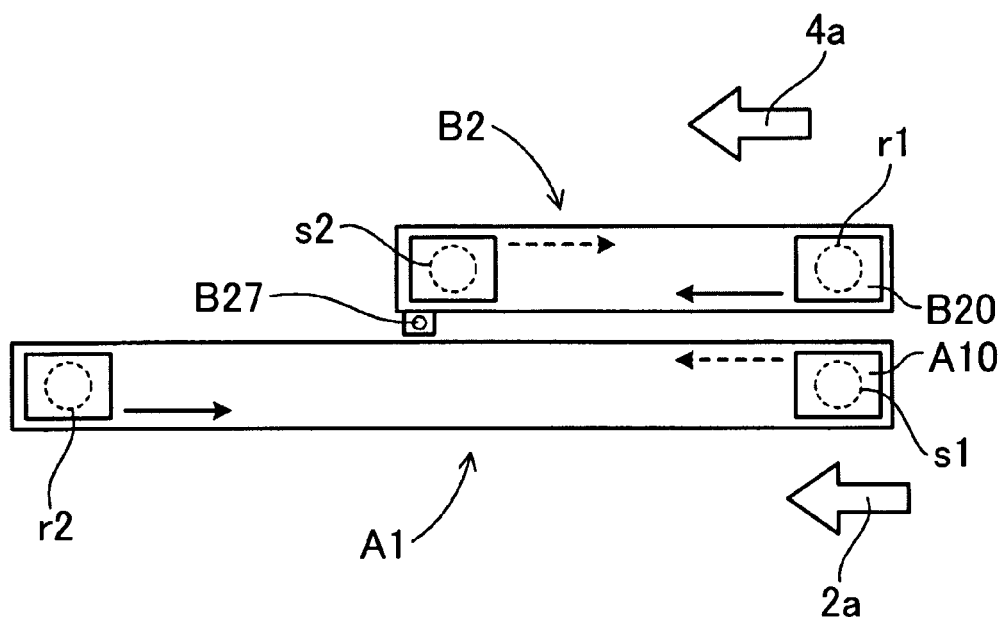
FIG. 25 is an explanatory drawing that shows the structure of a transfer apparatus according to a further exemplary embodiment.

As shown in FIG. 25, a further exemplary embodiment is provided in which the subsidiary operation in the subsidiary car 4 is carried out while it is stopped, whereas the main operation in the main car 2 is carried out while traveling. In this example, the first serving position s1 and the first receiving position r1 are at the same position. This example uses a delivery apparatus A1 that has a basic structure that is the same as to those described above and functions as a main delivery means, and a delivery apparatus B2 that has a function of holding and a function of releasing the mounting platform B20 at the highest point and serves as a subsidiary delivery means.

As shown in FIG. 25, when the subsidiary car 4, which moves in the direction of the arrow 4a, is positioned at the side of the first serving position s1, that is, the side of the mounting platform A10, which is positioned at the lowest point of the delivery apparatus A1, the subsidiary car 4 is stopped, and the jigs on the mounting platform A10 are moved to the subsidiary car 4. In addition, this position is also adjacent to the first receiving position r1, which is at the lowest point of the delivery apparatus B2.

In the subsidiary car 4, a subsidiary operation similar to that described above is carried out while it is stopped. At this time, the main car 2 is in back, where a separate operation is carried out while it is stopped.

After the subsidiary operation in the subsidiary car 4 has been completed, the jigs that have the parts installed are moved from the subsidiary car 4 to the first receiving position r1 on the mounting platform B10. Subsequently, accompanying the start of travel of the main car 2 in back, the subsidiary car 4 starts to travel. Accompanying the start of the travel of this subsidiary car 4, the mounting platform B10 and the subsidiary car 4 become linked, and the mounting platform B10, on which the parts and jigs have been mounted, moves forward along with the subsidiary car 2.

At the point in time in which the subsidiary car 4 has reached the side of the second serving position s2, that is, the mounting platform B20 moving in synchrony therewith has reached the highest point of the delivery apparatus B2, the state of engagement with the subsidiary car 4 is released. Here, in the delivery apparatus B2, until the operator of the main car 2 has operated the release lever B27, the subsidiary car 4 stands by at the second serving position s2.

In contrast, at the point in time in which the main car 2 has reached the side of the mounting platform A10, which is positioned at the first serving position s1, the main car 2 is linked to the mounting platform A10 and moves forward accompanying the empty mounting platform A10.

When the main car 2 is positioned at the side of the second serving position s2, that is, at the side of the highest point of the delivery apparatus B2, the jigs on which parts have been set are moved from the second serving position s2 to the main car 2. In addition, by operating the release lever B27, the mounting platform B20 is automatically moved to the lowest point of the delivery apparatus B2.

Subsequently as well, the main car 2 moves forward, and the empty mounting platform A10 continues to move in synchrony with the main car 2. In the main car 2, the main operation is carried out while moving. This main operation is carried out so as to be completed when or by the time that the mounting platform A10, which is moving in synchrony with the main car 2, has reached the highest point. Then, when or by the time that the mounting platform A10, which is moving in synchrony with the main car 2, has reached the highest point, the jigs that are no longer in use are moved from the main car 2 onto the mounting platform A10. In addition, when the mounting platform A10, which is moving in synchrony with the main car 2, has reached the second receiving position r2, which is at the highest point of the delivery apparatus A1, the state of engagement with the main car 2 is released. Thereby, the mounting platform A10 on which the jigs have been mounted moves under its own weight from the second receiving position r2, which is at the highest point, to the first serving position s1, which is at the lowest point, and returns to the stand-by state.

In this example as well, the transfer operation can be carried out repeatedly by the sequence of actions described above.

Figure 26:
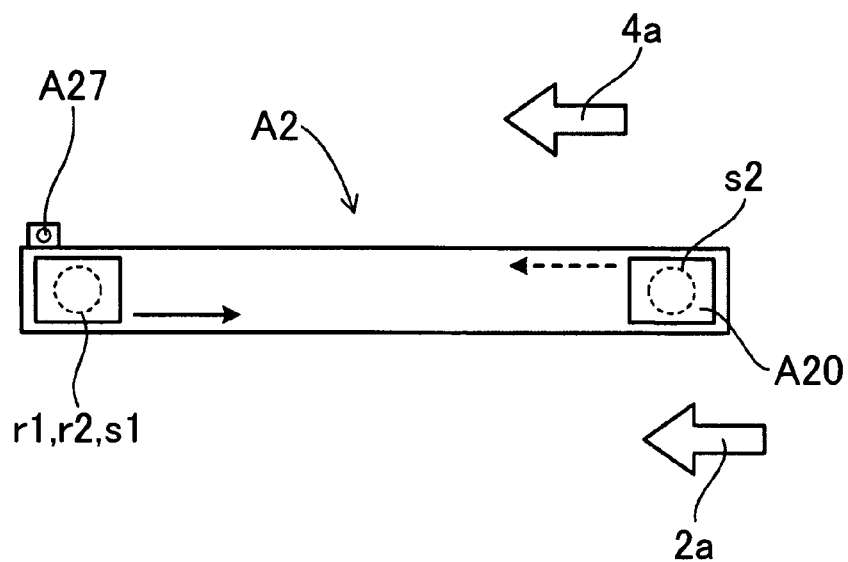
FIG. 26 is an explanatory drawing that shows the structure of a transfer apparatus according to a further exemplary embodiment.

As shown in FIG. 26, a further exemplary embodiment is provided in which the subsidiary operation in the subsidiary car 4 is carried out while it is stopped, whereas the main operation in the main car 2 is carried out while traveling. In this example, the first serving position s1, the first receiving position r1, and the second receiving position r2 are at the same position. In this example, like the delivery apparatus B2 described above, a delivery apparatus A2 is used that has a function of holding and a function of releasing the mounting platform A20 at the highest point, and it functions as subsidiary delivery means. This delivery apparatus A2 can be used when, for example, an operation that is similar to the case in which the main operation ML2 in FIG. 3 described above is carried out.

Note that in this example as well, by disposing the second serving position s2 farther to the back than the first receiving position r1 in the direction of forward movement of the main car 2, when designing the overall facility, it is possible to substantially shorten the length thereof, the design freedom is increased, and a more compact facility is easily realized.

As shown in FIG. 26, first, the mounting platform A20, on which the jigs have been mounted, is held at the first serving position s1, which is at the highest point of the delivery apparatus A2. Then, when the subsidiary car 4, which moves in the direction of the arrow 4a, is positioned at the side of the first serving position s1, that is, at the side of the mounting platform A20, which is positioned at the highest point of the delivery apparatus A2, the subsidiary car 4 is stopped, and the jigs on the mounting platform A20 are moved to the subsidiary car 4.

In the subsidiary car 4, a subsidiary operation similar to that described above is carried out while it is stopped. At this time, the main car 2 is in the back, where a separate operation is carried out while it is stopped.

After the subsidiary operation in the subsidiary car 4 has been completed, the jigs that have the parts installed are moved from the subsidiary car 4 to the first receiving position r1 on the mounting platform A20. Here, in the delivery apparatus A2, by the operator of the subsidiary car 4 operating the release lever A27 (refer to the release lever B27 in FIG. 29 described below), the mounting platform A20, on which the parts and jigs have been mounted, automatically moves to the lowest point of the delivery apparatus A2, and stands by at the second serving position s2.

Subsequently, accompanying the start of the travel of the main car 2 in the back, the subsidiary car 4 starts to travel. At the point in time that the main car 2 has reached the side of the second serving position s2, that is, the side of the lowest point of the delivery apparatus A2, the mounting platform A20 and the main car 2 are linked, and the main car 2 moves forward accompanying the mounting platform A20. In addition, when the main car 2 is positioned at the second serving position s2, the jigs, on which the parts have been set, are moved from the second serving position s2 to the main car 2. Then, in the main car 2, the main operation is carried out while moving.

This main operation is carried out so as to be completed when or by the time that the mounting platform A20, which is moving in synchrony with the main car 2, has reached the highest point. Then, when or by the time that the mounting platform S20, which is moving in synchrony with the main car 2, has reached the highest point, the jigs that are no longer in use are moved from the main car 2 onto the mounting platform A20. In addition, when the mounting platform S20, which is moving in synchrony with the main car 2, has reached the second receiving position r2, which is at the highest point of the delivery apparatus A2, the state of engagement with the main car 2 is released. In contrast, the mounting platform S20 is held at the highest point due to the functioning of the delivery apparatus A2.

In this example as well, the transfer operation can be carried out repeatedly by the sequence of actions described above.

Figure 27:
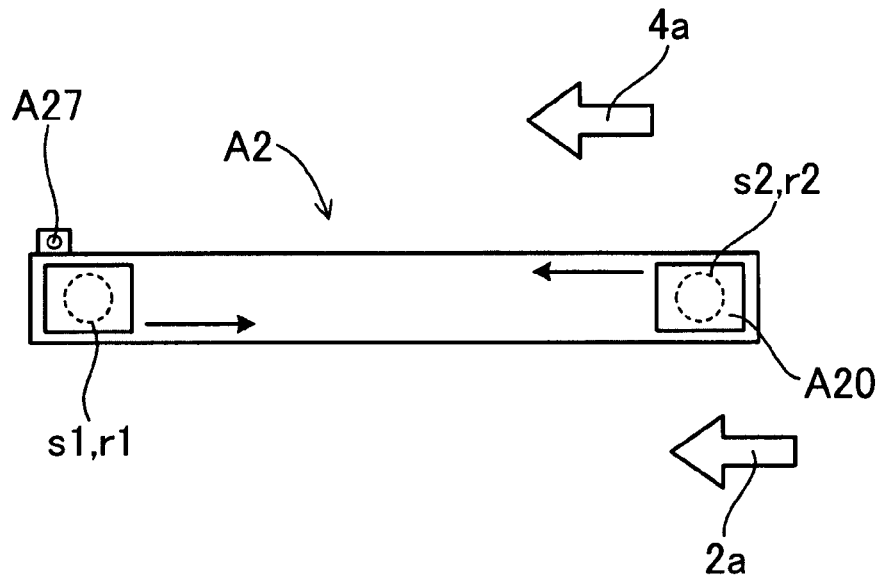
FIG. 27 is an explanatory drawing that shows the structure of a transfer apparatus according to a further exemplary embodiment.

As shown in FIG. 27, a further exemplary embodiment is provided in which the subsidiary operation in the subsidiary car 4 is carried out while it is stopped, and the main operation in the main car 2 is carried out while it is stopped. Specifically, in this example, the first serving position s1 and the first receiving position r1 are at the same position, and furthermore, the second serving position s2 and the second receiving position r2 are at the same position. In the present example, similar to the delivery apparatus A2 described above, a delivery apparatus A2 is used that has a function of holding and the function of releasing the mounting platform A20 at the highest point, and that functions as main delivery means and subsidiary delivery means.

Note that in this example as well, by disposing the second serving position s2 farther to the back than the first receiving position r1 in the direction of forward movement of the main car 2, when designing the overall facility, it is possible to substantially shorten the length thereof, the design freedom is increased, and a more compact facility is easily realized.

As shown in FIG. 27, first, the mounting platform A20 on which the jigs have been mounted is held at the first serving position s1, which is at the highest point of the delivery apparatus A2. Then, when the subsidiary car 4, which moves in the direction of the arrow 4a, is positioned at the side of the first serving position s1, that is, the side of the mounting platform A20, which is positioned at the highest point of the delivery apparatus A2, the subsidiary car 4 is stopped, and the jigs on the mounting platform A20 are moved to the subsidiary car 4.

In the subsidiary car 4, a subsidiary operation similar to that described above is carried out while it is stopped. At this time, the main car 2 is in the back, where a separate operation is carried out while it is stopped.

After the subsidiary operation in the subsidiary car 4 has been completed, the jig on which the part has been installed is moved from the subsidiary car 4 to the first receiving position r1 on the mounting platform A20. Here, in the delivery apparatus A2, by the operator of the subsidiary car 4 operating the release lever A27 (refer to the release lever B27 in FIG. 29 described below), the mounting platform A20, on which the parts and jigs have been mounted, automatically travels to the lowest point of the delivery apparatus A2 and stands by at the second serving point s2.

Subsequently, accompanying the start of travel of the main car 2 in back, the subsidiary car 4 starts to travel. The main car 2 stops at the point in time at which it has reached the side of the second serving position s2, that is, the side of the lowest point of the delivery apparatus A2. At this point in time, in the main car 2, the jigs that have been moved from the second serving position s2 and have the parts set therein are used, and the main operation is carried out while it is stopped.

When the main operation has been completed, the jigs that are no longer in use are moved to the mounting platform A20, which is at the second receiving position r2. Subsequently, accompanying the resumption of the travel of the main car 2, the linked mounting platform A20 moves in synchrony therewith. Then, when the mounting platform A20, which is moving in synchrony with the main car 2, has reached the second receiving position r2, which is at the highest point of the delivery apparatus A2, the state of engagement with the main car 2 is released. In contrast, the mounting platform A20 is then held at the highest point due to the function of the delivery apparatus S2.

In this example as well, it is possible to carry out the transfer operation repeatedly by the sequence of actions described above.

Figure 28:
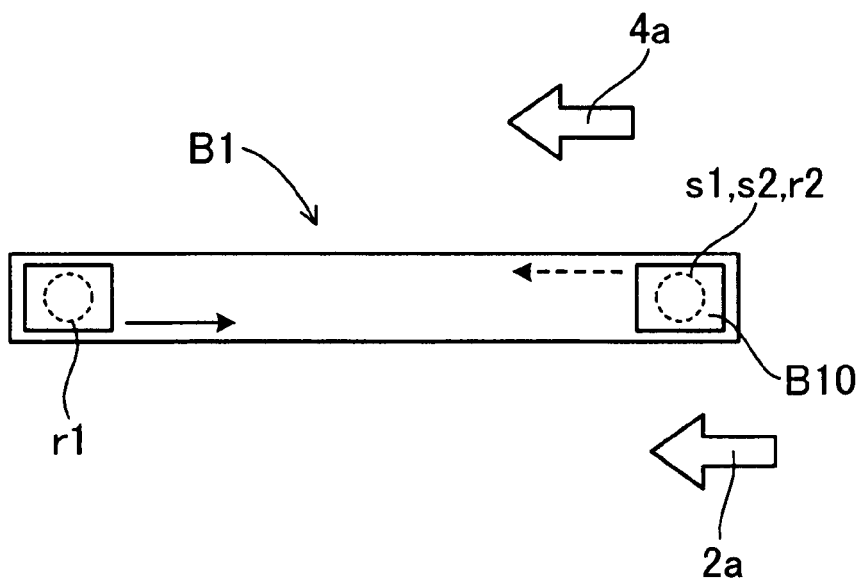
FIG. 28 is an explanatory drawing that shows the structure of a transfer apparatus according to a further exemplary embodiment.

As shown in FIG. 28, a further exemplary embodiment is provided in which the subsidiary operation in the subsidiary car 4 is carried out while moving, whereas the main operation in the main car 2 is carried out while it is stopped. In this example, the first serving position s1, the second serving position s2, and the second receiving position r2 are at the same position. In this example, a delivery apparatus B1 is used that has a structure similar to those described above and functions as subsidiary delivery means.

Note that in this example as well, by disposing the second serving position s2 farther to the back than the first receiving position r1 in the direction of forward movement of the main car 2, when designing the overall facility, it is possible to substantially shorten the length, the design freedom is increased, and a more compact facility is easily realized.

As shown in FIG. 28, when the subsidiary car 4, which moves in the direction of the arrow 4a, is positioned at the side of the second serving position s2, that is, the side of the mounting platform B10 at the lowest point of the delivery apparatus B1, the jigs on the mounting platform B10 are moved to the subsidiary car 4. In addition, from this point in time, the mounting platform B10 moves forward in synchrony with the subsidiary car 4.

At the subsidiary car 4, a subsidiary operation that is similar to that described above is carried out while moving farther. Then, when or by the time that the mounting platform B10, which is moving in synchrony with the subsidiary car 4, has reached the highest point, jigs in which parts have been installed are moved from the subsidiary car 4 to the mounting platform B10. In addition, when the mounting platform B10, which is moving in synchrony with the subsidiary car 4, has reached the first receiving position r1, which is at the highest point, the state of engagement with the subsidiary car 4 is released. Thereby, the mounting platform B10, on which the parts and jigs have been mounted, moves under its own weight from the first receiving position r1, which is at the highest point, to the second serving position s2, which is at the lowest point, and returns to the stand-by state.

Subsequently, when the main car 2, which moves in the direction of the arrow 2a, is positioned at the side of the second serving position s2, which is on the mounting platform B10 that is positioned at the lowest point of the delivery apparatus B1, it is stopped, and the jigs and parts on the mounting platform B10 are moved to the main car 2. In addition, in this example, the mounting platform B10 and the main car 2 are not linked.

While the main car 2 is maintained in a stopped state, a main operation that is similar to that described above is carried out. Then, after the main operation has been completed, the jigs that are no longer in use are moved from the main car 2 onto the mounting platform B10. Subsequently, the main car 2, which has been stopped, resumes traveling and departs.

In this example as well, the transfer operation can be carried out repeatedly by the sequence of actions described above.

Next, in the exemplary embodiments described above, examples were explained in which delivery apparatuses that have a basic structure similar to that of the delivery apparatus A1, which uses the inclined path, were used as the main delivery means and the subsidiary delivery means. However, it is possible to use instead delivery apparatuses that have the alternative structures described below as delivery apparatuses that function as a main delivery means or a subsidiary delivery means. Examples of these will be explained below.

The delivery apparatus B2 used in the fourth and seventh embodiments described above has a basic structure that is similar to that of the delivery apparatus A1 described above, and is provided with a function of holding and a function of releasing a mounting platform at the highest point. The structure that holds this mounting platform B2 at the highest point will be explained. Note that various other structures may be used for this holding function.

Figure 29A:
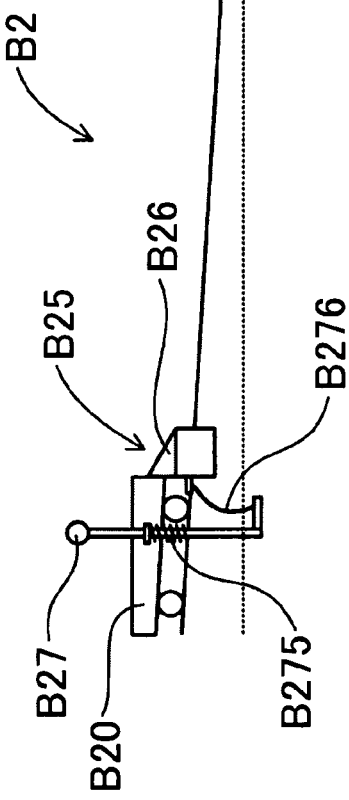
FIG. 29 is (a) a side view that shows the mounting platform holding structure of the delivery apparatus, and (b) a planar view that shows the mounting platform holding structure of the delivery apparatus according to an exemplary embodiment.
Figure 29B:
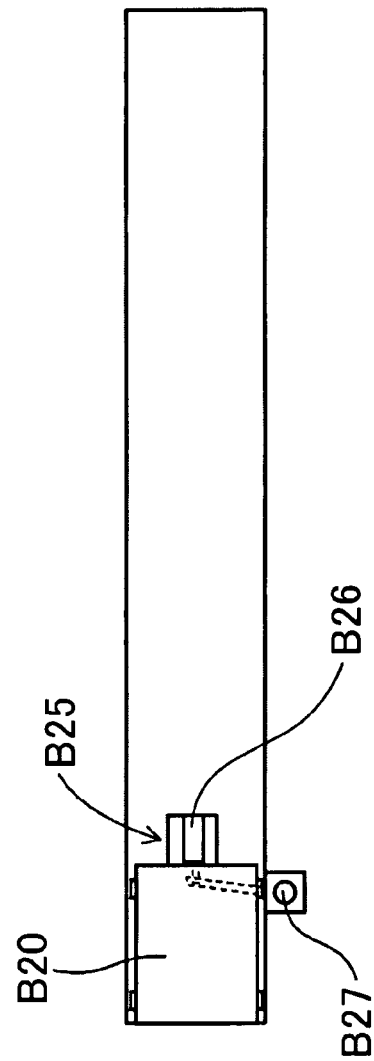
Figure 30:
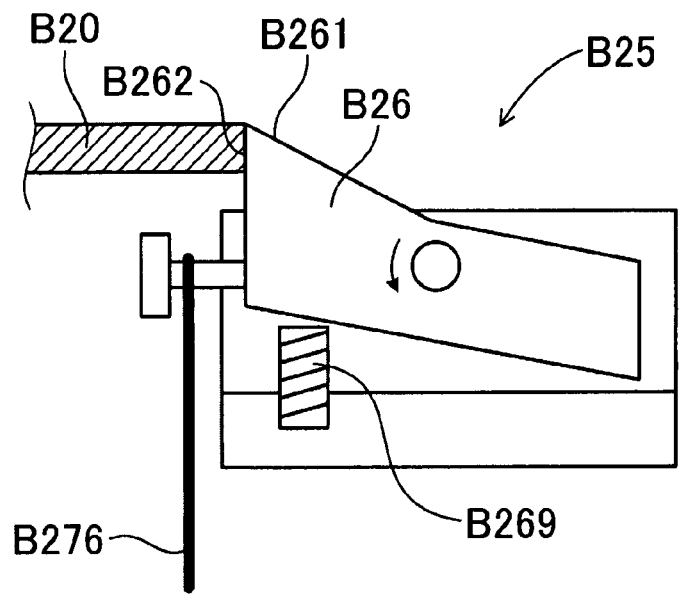
FIG. 30 is an explanatory drawing that shows the structure of a supporting apparatus that supports the mounting platform according to an exemplary embodiment.

As shown in FIG. 29 and FIG. 30, a supporting apparatus B25 is provided that supports the back end of the mounting platform B20 when it is positioned at the highest point. The supporting apparatus B25 includes an engaging member B26 that is urged upward by a spring B269. The upper surface of this engaging member B26 includes a tapered surface B261, and when the mounting platform B20 passes over the top, it is positioned so as to be in contact with this tapered surface B261. Thus, when the mounting platform B20 moves over the top of the engaging member B26, the engaging member B26 is pressed down, and when the mounting platform B20 has passed beyond the engaging member B26, the engaging member B26 rises due to the urging force of the spring, and the distal end surface B262 thereof abuts the back end of the mounting platform B20.

In addition, as shown in FIG. 29, the engaging member B26 is linked to a release lever B27. Specifically, the release lever B27 is urged upward by the spring B275, and at the same time, the lower end thereof is linked to the engaging member B26 by the linking wire B276. Thereby, by pressing the release lever B27 downward, the engaging member B26, which is linked thereto, is lowered. In addition, the engaging member B26 thereby no longer abuts the mounting platform B20, and the mounting platform B20 returns to the lowest point under its own weight.

Figure 31:
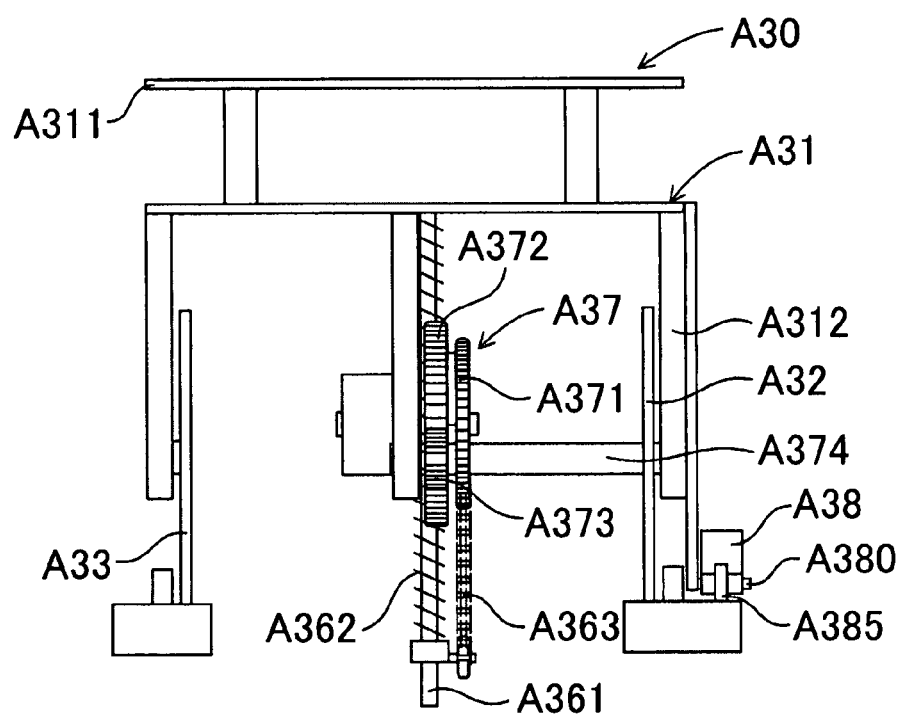
FIG. 31 is a frontal view that shows the structure of the mounting platform of an energy storing-type delivery apparatus according to an exemplary embodiment.

As shown in FIG. 31 to FIG. 33, it is also possible to use an energy storing-type delivery apparatus A3 as the delivery apparatus. This delivery apparatus A3 can be used, for example, when an operation is carried out that is similar to the case in which the main operation ML1 in FIG. 3 described above is carried out.

As shown in FIG. 31 and FIG. 32, the mounting platform A30 that is used in the delivery apparatus A3 includes energy storing means that stores energy accompanying movement and kinetic energy converting means that converts the energy that has been stored in the energy storing means to kinetic energy that acts in the direction opposite to that of this movement. In addition, the path A35 in the delivery apparatus A3 is disposed horizontally, and in the center portion thereof, a through hole A350 is provided in which a guide pole A361 of the mounting platform A30, which will be described below, is disposed.

As shown in FIGS. 31-33, the mounting platform A30 includes a frame portion A31 that includes a top plate A311, legs A312, and the like, a drive wheel A32 and a plurality of supporting wheels A33 that can rotate freely. In addition, the energy storing means and the kinetic energy converting means are structured by a spring that is disposed along the guide pole A361 and a gear set A37 that is linked via a chain A363 that is connected to the bottom end thereof. The gear set A37 is formed by a gear A371, around which a chain A363 is wrapped, and gears A372 and A373, which rotate by being linked thereto. A drive shaft A374 on which the gear A373 is provided is linked to the drive wheel A32.

Furthermore, the mounting platform A30 includes a substantially L-shaped abutting member A38 that can engage the engaging rod 215 that is provided on the main car (subsidiary car 4) on the bottom end of the leg A312. The abutting member A38 includes a first piece A381 and a second piece A382, and these are disposed so as to be able to rotate centered on the hinge A380. The standby wheel A385 that it able to freely rotate is disposed on the distal end of the second piece A382, and normally the standby wheel S385 abuts the path A35.

Next, the movement of the mounting platform S30 will be explained.

As shown in FIG. 32 and FIG. 33, when the mounting platform A30 moves from the start point to the end point in synchrony with the main car 2 due to being linked thereto, first the linking rod 215 of the main car 2 abuts the first piece A381 of the abutting member A38 of the mounting platform A30. At this time, because the standby wheel A385 abuts the path, the abutting relationship between the abutting member A38 and the linking rod 215 is maintained. Thereby, the forward movement force of the main car 2 is transferred to the mounting platform A30, and both move forward in synchrony.

As shown in FIG. 33, as the mounting platform A30 moves forward, the drive shaft A32 rotates, the gear set A37 that is linked thereto also rotates, and the spring A362 is compressed by the chain A363. That is, energy is stored in the spring A362, which serves as energy storing means.

When the mounting platform A30 has reached the end point of the path A35, the standby wheel A385 of the abutting member A38 is separated from the path A35, and rotates forward. Thereby, the engagement between the engaging rod 215 of the main car 2 and the abutting member A38 is released, and the forward movement of the mounting platform A30 stops. Then the mounting platform A30 begins to release the energy that has been stored by the spring A362 due to the linkage with the main car 2 being released. Thereby, the drive wheel A32 is driven by the kinetic energy converting means such as the gear set A37, which stores energy, and the mounting platform A30 is moved forward to the original position (start point).

In this manner, due to having the mounting platform A30 that is provided with the energy storing means and the kinetic energy converting means described above, it is possible for the delivery apparatus A3 to act similarly to the type of delivery apparatus that uses the inclined path described above. Thus, in each of the exemplary embodiments described above, the delivery apparatus A3 can be suitably used.

Figure 34:
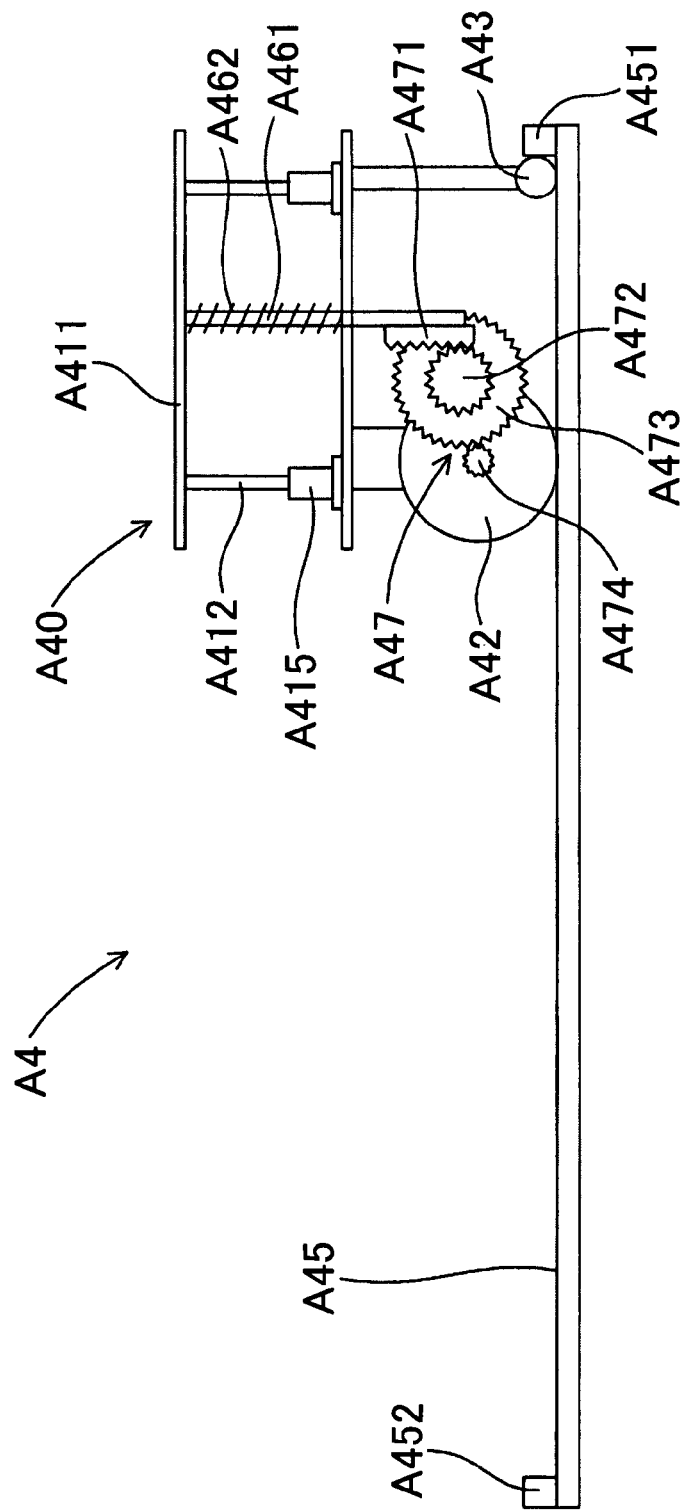
FIG. 34 is a side view that shows the structure of a self-reciprocating-type delivery apparatus according to an exemplary embodiment.
Figure 35:
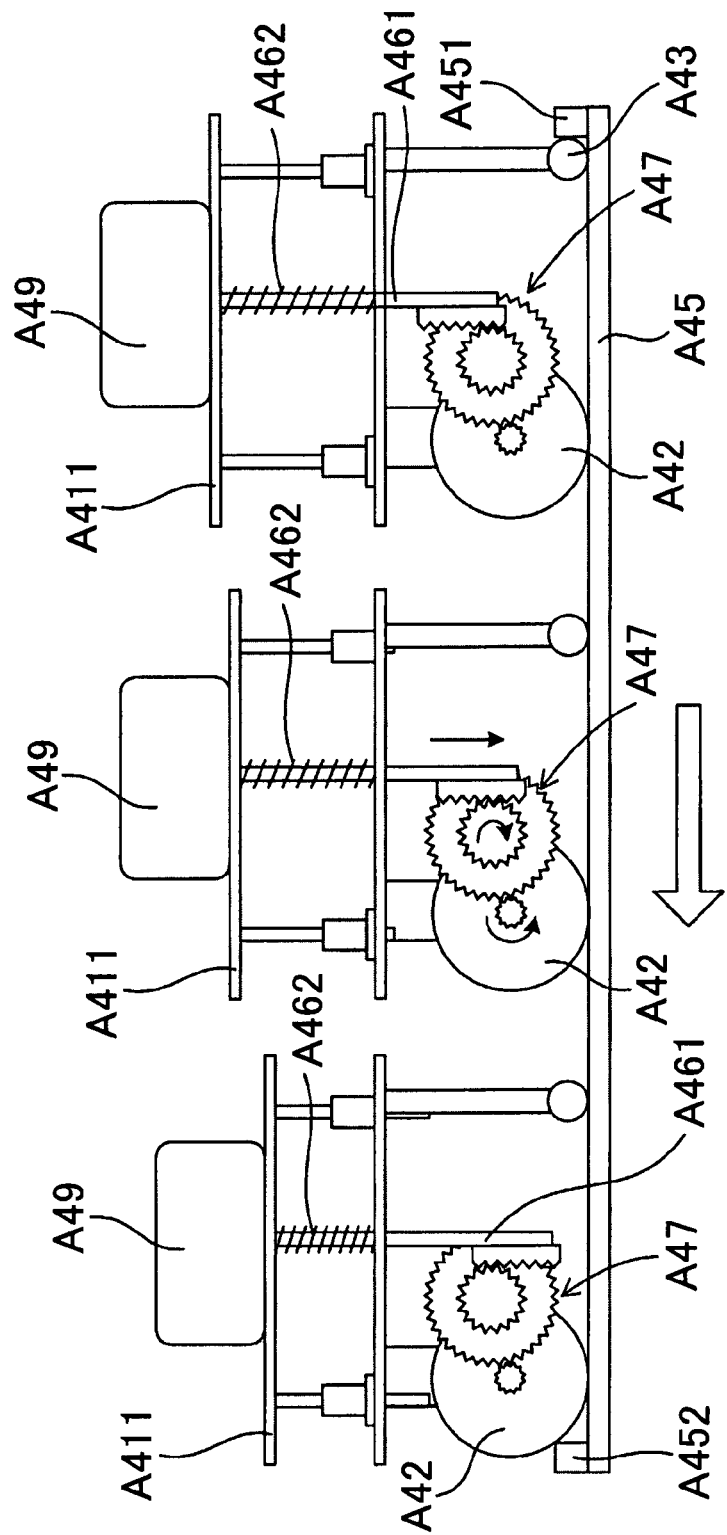
FIG. 35 is a side view that shows the state in which the mounting platform of the self-reciprocating-type delivery apparatus moves forward according to an exemplary embodiment.
Figure 36:
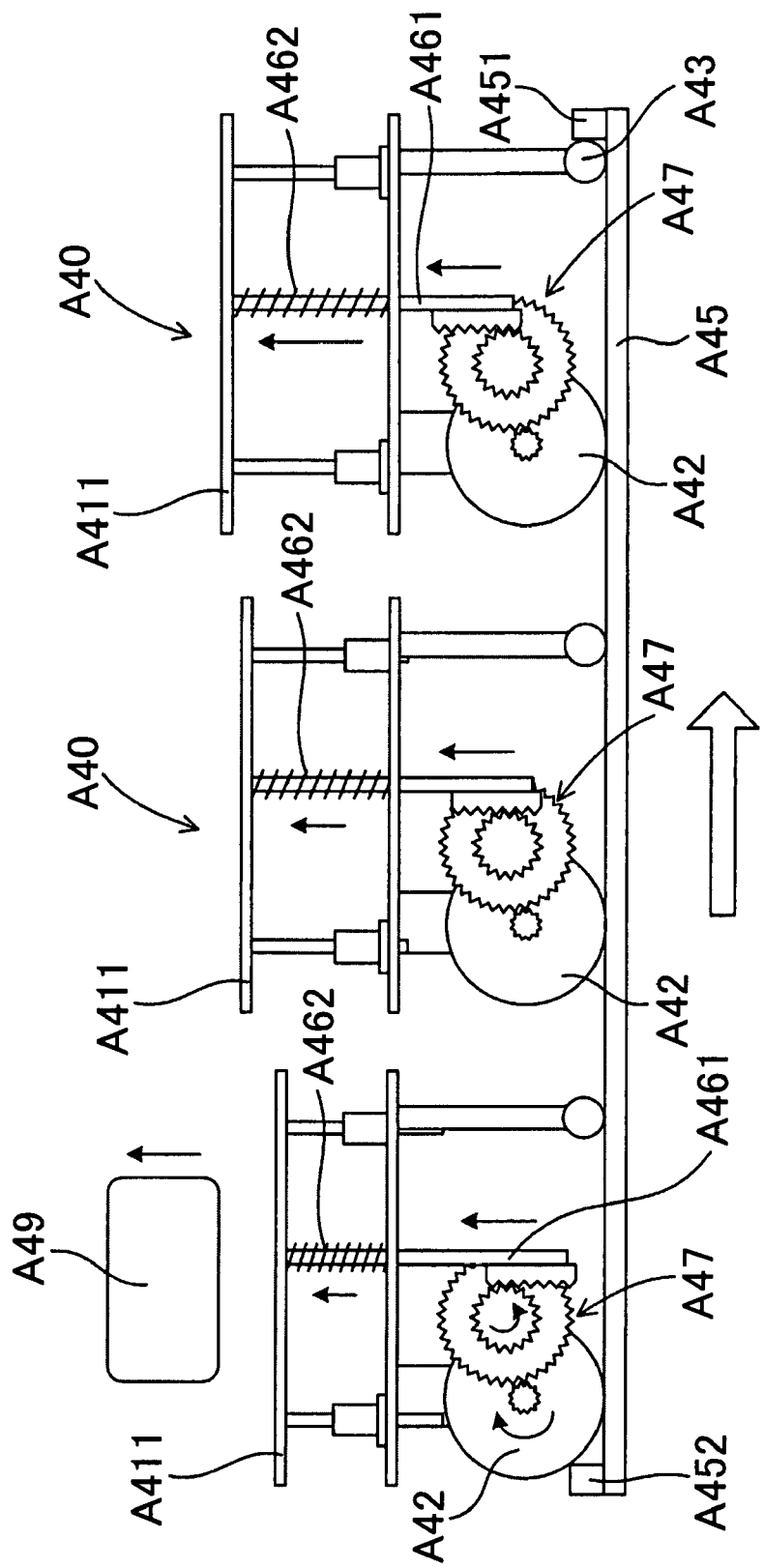
FIG. 36 is a side view that shows that state in which the mounting platform of the self-reciprocating-type delivery apparatus moves backward according to an exemplary embodiment.

As shown in FIG. 34 to FIG. 36, an automatic reciprocating-type delivery apparatus A4 can also be used as the delivery apparatus described above. This delivery apparatus A4 may be used, for example, when carrying out an operation that is similar to the case in which the main operation ML4 in FIG. 3 described above is carried out.

As shown in FIG. 34, the delivery apparatus A4 includes a mounting platform A40 that can move along the path A45 that is provided with stoppers A451 and A452 at both ends. The mounting platform A40 moves under the weight of the parts and/or jigs mounted thereon, and includes energy storing means that stores energy and kinetic energy converting means that converts the energy that has been stored by the energy storing means into kinetic energy.

As shown in FIGS. 34-36, the mounting platform A40 is held such that the top plate A411, which has a support rod A412, can be raised and lowered by a guide portion A415, and includes a drive wheel A42 and a plurality of freely rotatable support wheels A43. In addition, the energy storing means and the kinetic energy converting means are structured by a spring A462 that is disposed along the guide pole A461 and a gear set A47 that includes a rack gear A471 that is disposed on the bottom end of the guide pole A461. The gear set A47 is structured by the rack gear A471 and the gears A472, A473, and A474, which engage the rack gear A471 in sequence and are structured such that the rotation of the gear A474 is directly transferred to the drive wheel A42.

In addition, the mounting platform A40 is structured such that the top plate A411 is lowered by overcoming the urging force of the spring A462 due to parts and/or jigs that are mounted on the top plate A411, and the top plate A411 is raised due to the urging force of the spring A462 caused by the parts and/or jigs being removed from the top plate A411.

Next, the movement of the mounting platform A40 described above will be explained.

As shown in FIG. 35, when the parts and/or jigs are mounted on the top plate A411 of the mounting platform A40, which is standing by at the start point, the top plate A411 and the guide pole A461 are lowered due to the weight thereof, and the drive wheel A42 is driven via the gear set A47. Thereby, the mounting platform A40 moves forward toward the end point.

Then, accompanying the lowering of the top plate A411, the spring A462 is compressed, and energy is stored by the spring, which serves as the energy storing means.

In addition, at the point in time that the mounting platform A40 has abutted the stopper A452 at the end point, the forward motion of the mounting platform A40 stops and the mounting platform A40 returns to the standby state.

Subsequently, as shown in FIG. 36, by removing the part and/or jig A49, the spring A461 begins to decompress so as to release energy, and thereby, the top plate A411 and the guide pole A462 rise, and the drive wheel A42 is driven via the gear set A47. Thus, the mounting platform A40 moves forward toward the start point and stops at the point in time in which it abuts the stopper A451, and returns to the standby state.

In this manner, because the delivery apparatus A4 includes a mounting platform A40 that is provided with the energy storing means and the kinetic energy converting means described above, even if the main car 2 and the subsidiary car 4 are not in a linked state, it is possible to move them by using the weight of the parts and/or jigs. In this case as well, by appropriately selecting the start point and the end point, it is possible to act similarly to the type of delivery apparatus that uses the inclined path described above. Thus, in each of the exemplary embodiments described above, it is possible to use the delivery apparatus A4 appropriately as main delivery means or subsidiary delivery means.

As shown in FIG. 37 to FIG. 42, it is possible to use the rail-type delivery apparatuses A5 and A6 as the delivery apparatus described above. These delivery apparatuses A5 and A6 can be used when, for example, carrying out an operation that is similar to the case in which the main operation ML6 in FIG. 3 described above is carried out.

Figure 37:
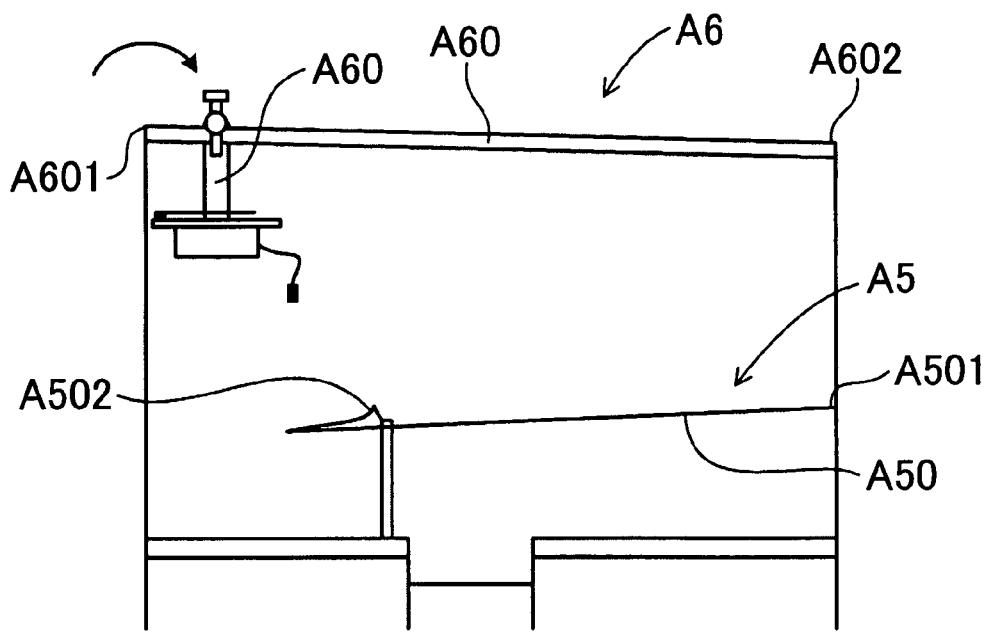
FIG. 37 is a side view that shows the structure of a rail-type delivery apparatus according to an exemplary embodiment.

As shown in FIG. 37, the delivery apparatus A5, which functions as a main delivery means, includes a rail A50 that is inclined such that the height decreases as the end point A502 is approached from the start point A501. The rail A50 is structured only by round rods.

Figure 38:
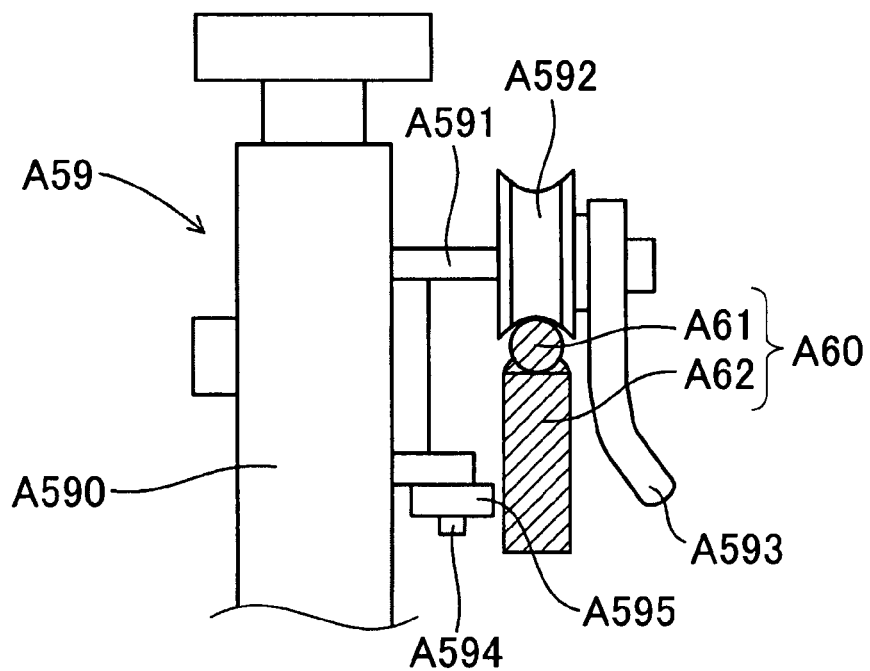
FIG. 38 is an explanatory drawing that shows the structure of a jig that can be applied to the rail-type delivery apparatus according to an exemplary embodiment.

In addition, as shown in the figures, the delivery apparatus A6, which functions as subsidiary delivery means, includes a rail A60 that is inclined such that the height decreases as the end point A602 is approached from the start point A601. As shown in FIG. 38, the rail 60 is structured by a round rod A61 and a reinforcing plate member A62 that is welded to the bottom portion thereof.

Figure 39:
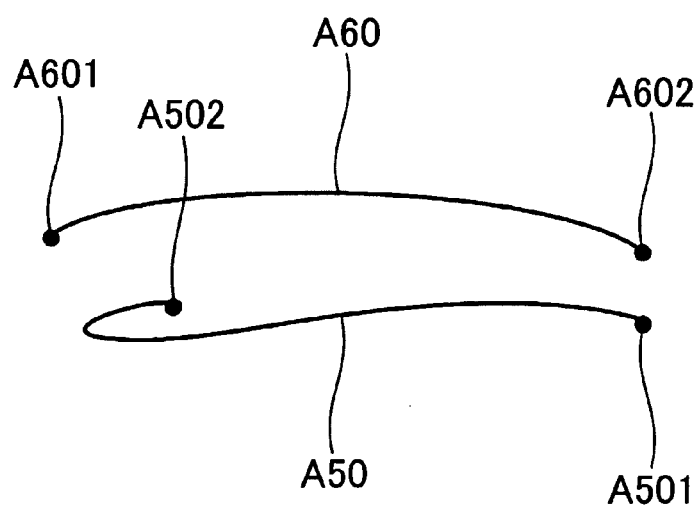
FIG. 39 is a planar view that shows the shape of the rail of the rail-type delivery apparatus according to an exemplary embodiment.

In addition, as shown in FIG. 39, when viewed from above, the rail A50 and the rail A60 are not linear, but have a curved shape.

In addition, as shown in FIG. 38, the jig A59 that can engage the rail A50 and the rail A60 and the parts that are set in the jig A59 are moved by the delivery apparatuses A5 and A6.

As shown in the figure, the jig A59 includes a pulley A592 that is disposed so as to be able to rotate centered on the support pin A591 that extends toward the side of the shank portion A590 and a guide plate A593. In addition, the jig A59 also includes a standby wheel A595 that is disposed so as to be able to rotate centered on the support pin A594. In addition, a part can be set on the bottom of the jig A59.

Next, the action of the jig 59 that uses the delivery apparatuses A5 and A6 will be explained.

Figure 40:
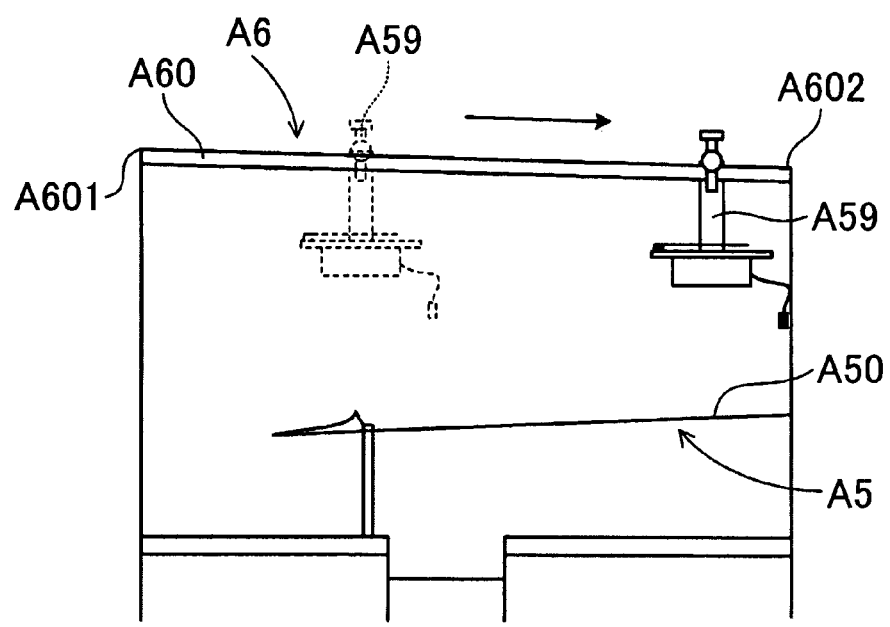
FIG. 40 is a side view that shows the state in which jigs and parts are moving forward due to the rail-type delivery apparatus according to an exemplary embodiment.

As shown in FIG. 40, first, when the jig A59 on which a part has been set engages in proximity to the start point A601 of the rail A60 of the delivery apparatus A6, under its own weight, the jig A59 moves toward the end point A602 while the pulley A692 that rides the rail A60 rotates, and in proximity to the end point A602, stops and returns to the standby state.

Figure 41:
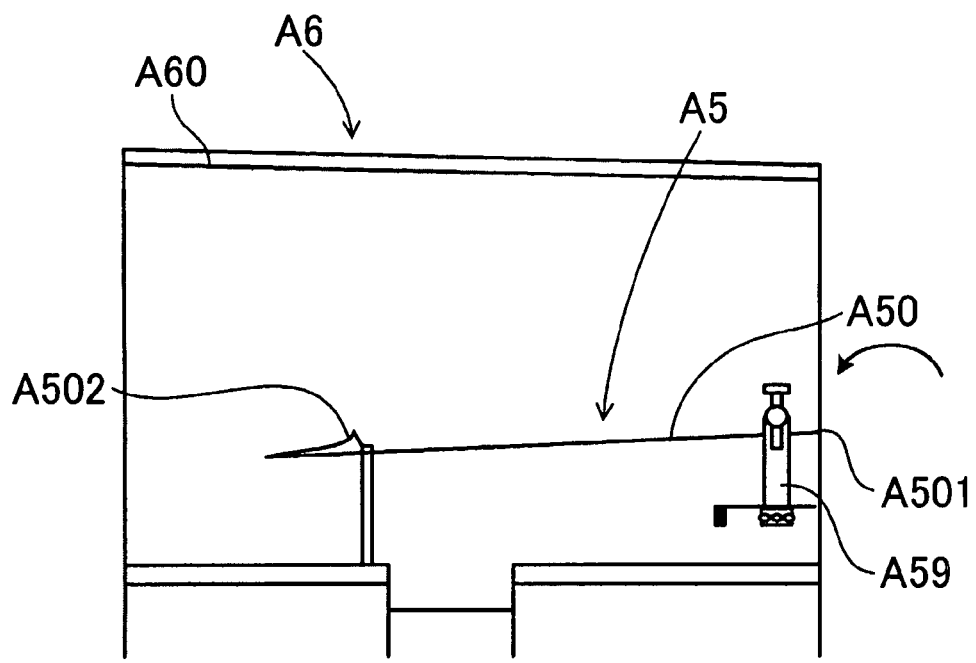
FIG. 41 is a side view that shows the state in which jigs are engaged to the rail-type delivery apparatus according to an exemplary embodiment.
Figure 42:
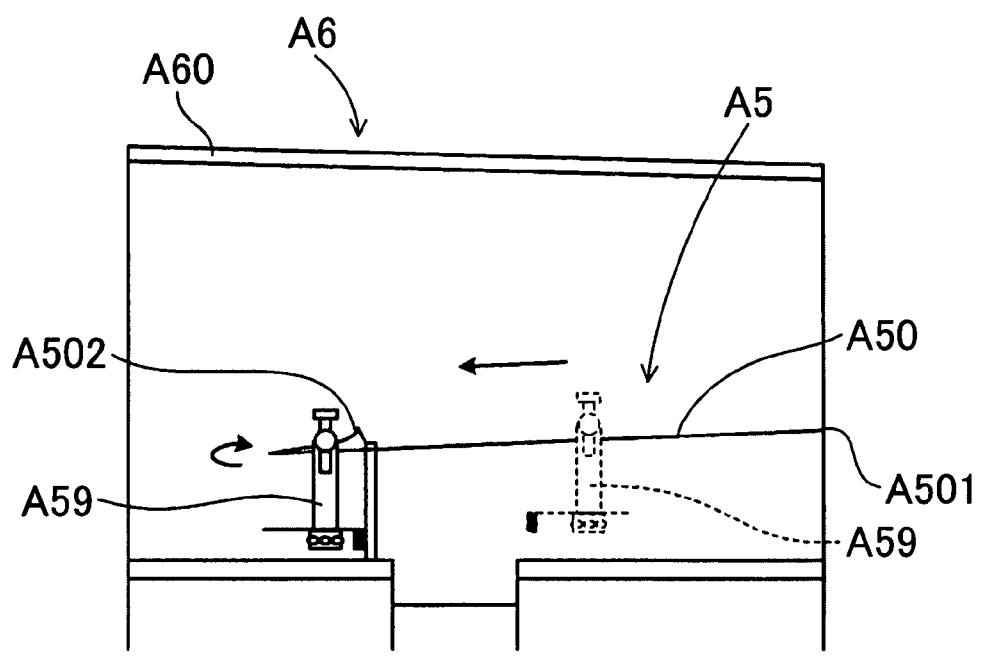
FIG. 42 is a side view that shows the state in which a jig is moving forward due to the rail-type transfer apparatus according to an exemplary embodiment.

Next, as shown in FIG. 41, after the operation that used the jig A59 has been completed, the jig that is no longer in use is engaged in proximity to the end point A501 of the rail A50 of the delivery apparatus A5. The jig A59 moves under its own weight toward the end point 502 while the pulley A592 that rides the rail A50 rotates. Then, as shown in FIG. 42, in proximity to the end point A502, the jig A59 stops and returns to the standby state.

In this manner, the delivery apparatus A5 and the delivery apparatus A6 can be used as delivery devices in the case in which a jig that can engage the rail A50 and the rail A60 is moved. Thus, in the case in which such a jig is used, in each of the embodiments described above, it is possible to use appropriately one or both of the delivery device A5 and the delivery device A6 as main delivery means or subsidiary delivery means.

The previous description of exemplary embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein, but is to be accorded the widest scope as defined by the limitations of the claims and equivalents thereof.

Figure 7:
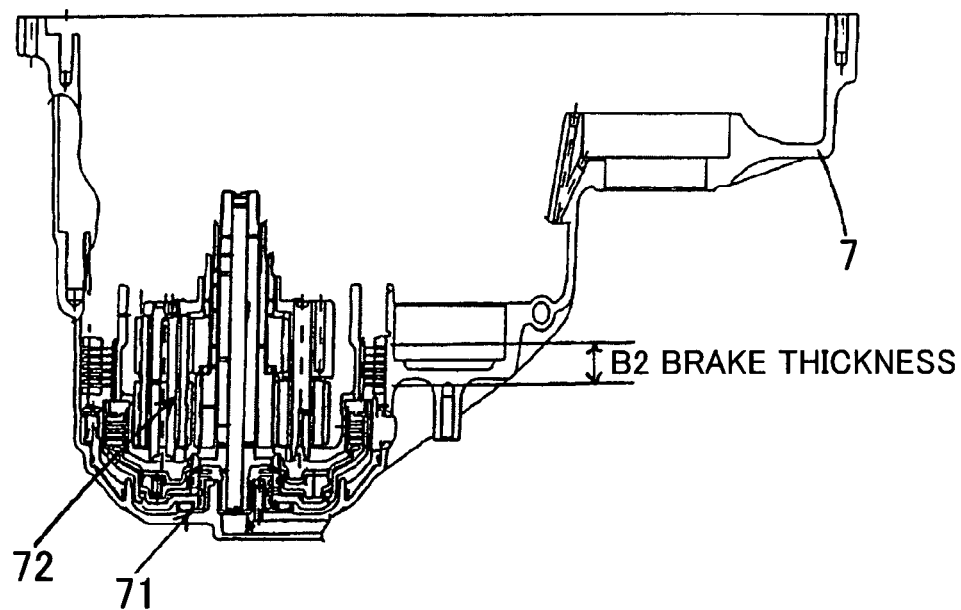
FIG. 7 is an explanatory drawing that shows the method in which the thickness of the B2 brake is measured according to an exemplary embodiment.

FIG. 4
1/OPERATION STEPS OVERVIEW LIST
2/MAIN OPERATION
3/SUBSIDIARY OPERATION
4/SYMBOL
5/NAME
ML1 B2 PISTON AND SNAP RING ASSEMBLED
ML2 REAR SUB-ASSEMBLY ASSEMBLED
ML3 B2 BRAKE PLATE THICKNESS MEASURED AND B2 BACKING PLATE SELECTED
ML4 B2 BACKING PLATE AND SNAP RING ASSEMBLED
ML5 F1 ONE-WAY CLUTCH AND SNAP RING ASSEMBLED
ML6 CENTER SUPPORT AND COUNTER GEAR ASSEMBLY ASSEMBLED
ML7 COUNTER GEAR INCLINATION MEASURED
ML8 DRIVE PINION ASSEMBLY ASSEMBLED FOR THE DIFF
ML9 FRONT ASSEMBLY DRIVE SUN GEAR AND B-1 BAND BRAKE ASSEMBLED
ML10 OIL PUMP ASSEMBLY BOLT TIGHTENED
ML11 END PLAY MEASURED
ML12 B1 BAND BRAKE STROKE MEASURED
M13 B1 PISTON ASSEMBLY ASSEMBLED
SL1 B2 ASSEMBLY ASSEMBLED
SL2 REAR SUB-ASSEMBLY ASSEMBLED
SL4 SNAP RING PREPARED
SL5 ONE-WAY CLUTCH AND SNAP RING PREPARED
SL6 COUNTER GEAR ASSEMBLY ASSEMBLED
SL8 1) DRIVE PINION ASSEMBLY ASSEMBLED
2) DIFF ASSEMBLY ASSEMBLED
SL9 FRONT SUB-ASSEMBLY ASSEMBLED
SL10 OIL PUMP ASSEMBLY ASSEMBLED
FIG. 7
B2 BRAKE THICKNESS
FIG. 11
DISTANCE MEASURED

The invention claimed is:

1. A cell manufacturing method in which a main operator, who carries out main operations including a plurality of steps in which parts are attached to a workpiece, is moved along with the workpiece so as to transit a plurality of stations at which auxiliary steps related to the main operations are carried out, the method comprising:
providing a main car on which a workpiece is mounted and on which the main operator rides; and
providing a subsidiary car in which a subsidiary operator rides, the subsidiary operator carrying out subsidiary operations in which at least one of a part and a jig that is necessary for at least one of the main operations is prepared;
wherein the main car automatically travels along a predetermined travel route that transits the plurality of stations, and the subsidiary car travels together with the main car so as to enable operations of transferring the at least one of the part and the jig between the subsidiary car and the main car.

2. The cell manufacturing method according to claim 1, wherein the subsidiary operations include operations in which the parts are assembled by combining and carrying out pre-assembling of component parts.

3. The cell manufacturing method according to claim 1, wherein the subsidiary operations include operations in which the part is set on jig.

4. The cell manufacturing method according to claim 1, wherein at least a portion of the operations, in which the at least one of the part and the jig is transferred between the main car and the subsidiary car, are carried out by using transfer apparatus, the transfer apparatuses comprising,
 a first serving position s1 where the at least one of the part and the jig is transferred to the subsidiary car, a first receiving position r1 where the at least one of the part and the jig is received from the subsidiary car, a second serving position s2 where the at least one of the part and the jig is transferred to the main car, and a second receiving position r2 where the at least one of the part and the jig is received from the main car; and
 at least one among of main delivery means that delivers the at least one of the part and the jig received at the second receiving position r2 to the first serving position s1, and subsidiary delivery means that delivers the at least one of the part and the jig that is received at the first receiving position r1 to the second serving position s2.

5. The cell manufacturing method according to claim 4, wherein the second serving position s2 is disposed more toward a back of the transfer apparatus than the first receiving position r1 in a direction of forward movement of the main car.

6. A cell manufacturing facility in which a main operator, who carries out main operations that include a plurality of steps in which parts are attached to a workpiece, is moved along with the workpiece so as to transit a plurality of stations at which auxiliary steps related to the main operations are carried out, the manufacturing facility comprising:
 a main car that is provided with a workpiece holding portion that holds the workpiece, and a riding portion that enables a main operator to ride while being able to carry out an operation on the workpiece that is held in the workpiece holding portion, and that is provided with a travel control apparatus that controls a travel state of the main car; and
 a subsidiary car that is provided with a riding platform on which a subsidiary operator rides, the subsidiary operator carrying out subsidiary operations in which at least one of a part and a jig that is necessary for at least one of the main operations is prepared;
 wherein the main car automatically travels along a predetermined travel route that transits the plurality of stations, and the subsidiary car travels together with the main car so as to enable operations of transferring the at least one of the part and the jig between the main car and the subsidiary car.

7. The cell manufacturing facility according to claim 6, wherein a plurality of main cars can travel simultaneously along the travel route.

8. The cell manufacturing facility according to claim 6, wherein the subsidiary car is provided with tracking means for traveling with the main car.

9. The cell manufacturing facility according to claim 8, wherein the tracking means is a linking rod that links the subsidiary car and the main car.

10. The cell manufacturing facility according to claim 8, wherein the tracking means comprises a wireless communication means that operates between the subsidiary car and the main car and a subsidiary travel control apparatus that controls the travel of the subsidiary car.

11. The cell manufacturing facility according to claim 8, wherein a same number of subsidiary cars as the plurality of main cars are provided to travel together in correspondence with the main cars, respectively.

12. The cell manufacturing facility according to claim 6, wherein the main car has a circular route that returns to an original position in one cycle and the subsidiary car has a circular subsidiary route on an outside of the circular route of the main car.

13. The cell manufacturing facility according to claim 6, wherein a travel route of the main car is segmented into a plurality of segments, and separate subsidiary cars are provided that travel along the travel route segments, respectively.

14. The cell manufacturing facility according to claim 6, wherein the subsidiary car has a subsidiary travel route for travel together with the main car, and has a subsidiary return route on which the subsidiary car returns to an original position after being separated from the main car.

15. The cell manufacturing facility according to claim 6, wherein the subsidiary car has a subsidiary travel route for travel together with the main car, and the subsidiary car returns to an original position by traveling in reverse along the subsidiary travel route after being separated from the main car.

16. The cell manufacturing facility according to claim 6, comprising a transfer apparatus which carries out the operation of transferring the at least one of the part and the jig between the main car and the subsidiary car, the transfer apparatus comprising,
 a first serving position s1 where the at least one of the part and the jig is transferred to the subsidiary car, a first receiving position r1 where the at least one of the part and the jig is received from the subsidiary car, a second serving position s2 where the at least one of the part and the jig is transferred to the main car, and a second receiving position r2 where the at least one of the part and the jig is received from the main car; and
 at least one of main delivery means that delivers the at least one of the part and the jig that has been received at the second receiving position r2 to the first serving position s1 and subsidiary delivery means that delivers the at least one of the part and the jig that has been received at the first receiving position r1 to the second serving position s2.

17. The cell manufacturing facility according to claim 16, wherein:
 at least one of the main delivery means and the subsidiary delivery means has a mounting platform that can move between a start point and an end point;
 the mounting platform is disposed so as to be able to move along an inclined path that is inclined such that a height of the path increases as the end point of the path is approached from the start point of the path, and
 the mounting platform moves in synchrony with at least one of the main car and the subsidiary car from the start point to the end point in a linked state, and, by releasing a link with at least one of the main car and the subsidiary car at the end point, returns to the start point by moving along the inclined path under its own weight, and rests in a standby area.

18. The cell manufacturing facility according to claim 16, wherein at least one of the main delivery means and the subsidiary delivery means has a mounting platform that can move between a start point and end point,
 the mounting platform comprises energy storing means that stores energy accompanying movement of the mounting platform from the start point to the end point and kinetic energy converting means that converts energy stored by the energy storing means to kinetic energy that acts on the mounting platform from the end point to the start point, and the mounting platform moves in synchrony with the at least one of the main car and the subsidiary car from the start point to the end point in a linked state so that the energy storing means stores energy; and, by releasing the link with the at least one of the main car and the subsidiary car at the end point, moves due to the kinetic energy, and returns to the start point to stand-by.

19. The cell manufacturing facility according to claim 16, wherein:

at least one of the main delivery means and the subsidiary delivery means has a mounting platform which mounts the at least one of the part and the jig, and that can move between a start point and an end point;

the mounting platform moves from the start point to the end point under a weight of the at least one of the part and the jig that has been mounted on the mounting platform and has energy storing means that stores energy and kinetic energy converting means that converts the energy that is stored by the energy storing means into kinetic energy; and the mounting platform moves from the start point to the end point and stands by after energy has been stored by the energy storing means, and the mounting platform moves to return to the start point to stand-by due to the kinetic energy, which is energy stored by the energy storing means that has been converted by the kinetic energy converting means.

20. The cell manufacturing facility according to claim 16, wherein at least one of the main delivery means and the subsidiary delivery means has a rail that is inclined such that a height of the rail decreases as the end point is approached from the start point, and the at least one of the part and the jig is moved to the end point along the rail under their own weight to a stand-by area.

* * * * *